US011333503B2

(12) United States Patent
Dean et al.

(10) Patent No.: US 11,333,503 B2
(45) Date of Patent: May 17, 2022

(54) GLOBAL AND LOCAL NAVIGATION FOR SELF-DRIVING

(71) Applicant: UATC, LLC, San Francisco, CA (US)

(72) Inventors: Robert Michael S Dean, North Bethesda, MD (US); Xiaodong Zhang, Pittsburgh, PA (US); Eric Michael Perko, Pittsburgh, PA (US); Adam Cole Panzica, Pittsburgh, PA (US); Bryan John Nagy, Allison Park, PA (US); Brett Bavar, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 595 days.

(21) Appl. No.: 16/125,205

(22) Filed: Sep. 7, 2018

(65) Prior Publication Data

US 2019/0324466 A1    Oct. 24, 2019

Related U.S. Application Data

(60) Provisional application No. 62/660,014, filed on Apr. 19, 2018.

(51) Int. Cl.
*G01C 21/32* (2006.01)
*G05D 1/02* (2020.01)
(Continued)

(52) U.S. Cl.
CPC ......... *G01C 21/32* (2013.01); *B60W 60/0011* (2020.02); *G01C 21/3446* (2013.01);
(Continued)

(58) Field of Classification Search
CPC ............... G05D 1/0217; G05D 1/0274; G05D 2201/0212; G01C 21/3446; G01C 21/3658; G01C 21/3453; B60W 60/0011
See application file for complete search history.

(56) References Cited

U.S. PATENT DOCUMENTS

| 7,031,829 | B2 * | 4/2006 | Nisiyama | G01C 21/3461 |
| | | | | 340/988 |
| 9,222,795 | B1 | 12/2015 | Gerlach | |

(Continued)

OTHER PUBLICATIONS

"U.S. Appl. No. 16/125,000, Non Final Office Action dated May 27, 2021", 18 pgs.

(Continued)

*Primary Examiner* — Michael J Zanelli
(74) *Attorney, Agent, or Firm* — Schwegman Lundberg & Woessner, P.A.

(57) ABSTRACT

An autonomous vehicle (AV) includes a vehicle computing system including one or more processors programmed to receive map data associated with a map of a geographic location, determine, based on the map data, one or more local routes in the one or more roadways between the current location of the AV and one or more exit locations, and control travel of the AV based on a selected local route of the one or more local routes. The map includes one or more roadways in the geographic location. The map data includes a global route in the one or more roadways between a current location of the AV and a destination location of the AV. The one or more exit locations are located between the current location of the AV and the destination location of the AV.

17 Claims, 15 Drawing Sheets

(51) Int. Cl.
*G01C 21/34* (2006.01)
*B60W 60/00* (2020.01)
*G01C 21/36* (2006.01)
*G01S 19/42* (2010.01)

(52) U.S. Cl.
CPC ..... *G01C 21/3469* (2013.01); *G01C 21/3492* (2013.01); *G01C 21/3667* (2013.01); *G01C 21/3676* (2013.01); *G05D 1/0217* (2013.01); *G05D 1/0219* (2013.01); *G05D 1/0274* (2013.01); *G05D 1/0278* (2013.01); *B60W 2552/10* (2020.02); *B60W 2552/53* (2020.02); *B60W 2554/00* (2020.02); *G01S 19/42* (2013.01); *G05D 2201/0212* (2013.01)

(56) References Cited

U.S. PATENT DOCUMENTS

| | | | |
|---|---|---|---|
| 10,545,024 | B1* | 1/2020 | Konrardy ................ G08G 1/20 |
| 10,860,023 | B2 | 12/2020 | Di Cairano et al. |
| 2017/0192436 | A1 | 7/2017 | Min et al. |
| 2018/0095471 | A1* | 4/2018 | Allan ................... G05D 1/0088 |
| 2018/0143643 | A1 | 5/2018 | Fairfield et al. |
| 2018/0224286 | A1* | 8/2018 | Pickering ........... G01C 21/3453 |
| 2018/0275653 | A1 | 9/2018 | Endo et al. |
| 2019/0163191 | A1 | 5/2019 | Sorin et al. |
| 2019/0243372 | A1 | 8/2019 | Huval et al. |
| 2019/0324475 | A1 | 10/2019 | Dean et al. |
| 2019/0344795 | A1 | 11/2019 | Ishioka et al. |
| 2020/0096355 | A1 | 3/2020 | Mishina et al. |
| 2020/0166945 | A1 | 5/2020 | Kim et al. |
| 2020/0225044 | A1 | 7/2020 | Tohriyama et al. |
| 2020/0346662 | A1 | 11/2020 | Suzuki et al. |
| 2021/0107566 | A1 | 4/2021 | Seegmiller et al. |

OTHER PUBLICATIONS

"U.S. Appl. No. 16/125,000, Examiner Interview Summary dated Aug. 20, 2021", 3 pgs.
"U.S. Appl. No. 16/125,000, Response filed Sep. 27, 2021 to Non Final Office Action dated May 27, 2021", 21 pgs.
"U.S. Appl. No. 16/125,000, Notice of Allowance dated Oct. 14, 2021", 10 pgs.

* cited by examiner

GLOBAL AND LOCAL NAVIGATION FOR SELF-DRIVING

CROSS REFERENCE TO RELATED APPLICATIONS

This application claims the benefit of U.S. Provisional Application No. 62/660,014, filed Apr. 19, 2018, the entire disclosure of which is hereby incorporated by reference in its entirety.

BACKGROUND

An autonomous vehicle (AV) (e.g., a driverless car, a driverless auto, a self-driving car, a robotic car, etc.) is a vehicle that is capable of sensing an environment of the vehicle and traveling (e.g., navigating, moving, etc.) in the environment without human input. An AV uses a variety of techniques to detect the environment of the AV, such as radar, laser light, Global Positioning System (GPS), odometry, and/or computer vision. In some instances, an AV uses a control system to interpret information received from one or more sensors, to identify a route for traveling, to identify an obstacle in a route, and to identify relevant traffic signs associated with a route.

SUMMARY

According to some non-limiting embodiments or aspects, provided is an autonomous vehicle (AV) including a vehicle computing system including one or more processors, the vehicle computing system is configured to receive map data associated with a map of a geographic location, the map of the geographic location, including one or more roadways in the geographic location, and the map data includes a global route in the one or more roadways between a current location of the AV and a destination location of the AV, to determine, based on the map data, one or more local routes in the one or more roadways between the current location of the AV and one or more exit locations, and the one or more exit locations are located between the current location of the AV and the destination location of the AV, and to control travel of the AV based on a selected local route of the one or more local routes.

In some non-limiting embodiments or aspects, the vehicle computer system determining the one or more local routes in the one or more roadways between the current location and the AV and the one or more exit locations includes determining, based on map data, a plurality of local routes in the one or more roadways between the current location of the AV and a plurality of exit locations, and the plurality of exit locations are located between the current location of the AV and the destination location of the AV.

In some non-limiting embodiments or aspects, the vehicle computing system is further configured to determine the selected local route of the plurality of local routes based on sensor data associated with an object detected in an environment surrounding the AV.

In some non-limiting embodiments or aspects, the vehicle computing system is further configured to determine a plurality of costs associated with modifying the global route between the current location of the AV and the destination location of the AV based on the plurality of local routes, and to determine the selected local route of the plurality of local routes based on the plurality of costs associated with modifying the global route.

In some non-limiting embodiments or aspects, the vehicle computing system is further configured to modify the global route based on the selected local route.

In some non-limiting embodiments or aspects, the vehicle computing system is further configured to determine the one or more exit locations based on a threshold distance and the current location of the AV, to determine a plurality of candidate local routes in the one or more roadways for each exit location of the one or more exit locations, and to determine a lowest cost candidate local route for each exit location of the one or more exit locations based on a cost associated with the one or more roadways.

In some non-limiting embodiments or aspects, the vehicle computing system is further configured to determine the threshold distance of the one or more exit locations from the current location of the AV based on a sensor range of a sensor of the AV.

In some non-limiting embodiments or aspects, determining the lowest cost candidate local route of the plurality of candidate local routes for each exit location of the one or more exit locations further includes the vehicle computing system configured to determine at least one diversion point at which a first plurality of candidate routes associated with a first exit location of the one or more exit locations diverges from a second plurality of candidate local routes associated with a second exit location of the one or more exit locations, to determine a first candidate local route and a second candidate local route in the first plurality of local candidate routes based on the at least one diversion point, the first candidate local route includes one or more lanes in the one or more roadways different from at least one lane in the one or more roadways in the second candidate local route; and to determine the lowest cost candidate local routes associated with the first exit location based on a cost associated with the one or more lanes in the first candidate local route and at least one lane in the second candidate local route.

According to some non-limiting embodiments or aspects, provided is a method including receiving, with a computer system including one or more processors, map data associated with a map of a geographic location, wherein the map data includes a global route in the one or more roadways between a current location of an autonomous vehicle (AV) and a destination location of the AV, determining, with the computer system, based on the map data, one or more local routes in the one or more roadways between the current location of the AV and one or more exit locations, wherein the one or more exit locations are located between the current location of the AV and the destination location of the AV; and providing, with the computer system, route data associated with the one or more local routes for controlling travel of the AV on a local route of the one or more local routes.

In some non-limiting embodiments or aspects, when determining the one or more local routes in the one or more roadways between the current location of the AV and the one or more exit locations, the method further comprises determining, with the computer system, based on the map data, a plurality of local routes in the one or more roadways between the current location of the AV and a plurality of exit locations, and the plurality of exit locations are located between the current location of the AV and the destination location of the AV.

In some non-limiting embodiments or aspects, the method includes determining, with the computer system, the local route of the plurality of local routes based on sensor data associated with an object detected in an environment surrounding the AV.

In some non-limiting embodiments or aspects, the method includes determining, with the computer system, a plurality of costs associated with modifying the global route between the current location of the AV and the destination location of the AV based on the plurality of local routes; and determining, with the computer system, the local route of the plurality of local routes based on the plurality of costs associated with modifying the global route.

In some non-limiting embodiments or aspects, the method includes modifying with the computer system, the global route based on the local route.

In some non-limiting embodiments or aspects, the method includes determining, with the computer system, the one or more exit locations based on a threshold distance and the current location of the AV; determining, with the computer system, a plurality of candidate local routes in the one or more roadways for each exit location of the one or more exit locations; and determining, with the computer system, a lowest cost candidate local route of the plurality of candidate local routes for each exit location of the one or more exit locations based on a cost associates with the one or more roadways.

In some non-limiting embodiments or aspects, the method includes determining, with the computer system, a threshold distance of the one or more exit locations from the current location of the AV based on a sensor range of a sensor of the AV.

In some non-limiting embodiments or aspects, determining the lowest cost candidate local route of the plurality of candidate local routes for each exit location of the one or more exit locations further comprises determining, with the computer system, at least one diversion point at which a first plurality of candidate local routes associated with a first exit location of the one or more exit locations diverges from a second plurality of candidate local routes associated with a second exit location of the one or more exit locations; determining, with the computer system, a first candidate local route and a second candidate local route in the first plurality of local candidate routes based on the at least one diversion point, where the first candidate local route includes one or more lanes in the one or more roadways different from at least one lane in the one or more roadways in the second candidate local route; and determining, with the computer system, the lowest cost candidate local route in the plurality of candidate local routes associated with the first exit location based on a cost associated with the one or more lanes in the first candidate local route.

According to some non-limiting embodiments or aspects, provided is a computer program product comprising at least one non-transitory computer-readable medium including one or more instructions that, when executed by at least one processor, cause the at least one processor to receive map data associated with a map of a geographic location, where the map includes one or more roadways in the geographic location, and where the map data includes a global route in the one or more roadways between a current location of an autonomous vehicle (AV) and a destination location of the AV, to determine, based on map data, one or more local routes in the one or more roadways between the current location of the AV and one or more exit locations, where the one or more exit locations are located between the current location of the AV and the destination location of the AV; and to provide route data associated with the one or more local routes for controlling travel of the AV on a local route of the one or more local routes.

In some non-limiting embodiments or aspects, the one or more instructions, when determining the one or more local routes in the one or more roadways between the current location of the AV and the one or more exit locations, further cause the at least one processor to determine, based on map data, a plurality of local routes in the one or more roadways between the current location of the AV and a plurality of exit locations, where the plurality of exit locations are located between the current location of the AV and the destination location of the AV; and determine the local route of the plurality of local routes based on sensor data associated with an object detected in an environment surrounding the AV.

In some non-limiting embodiments or aspects, the one or more instructions to determine the one or more exit locations based on a threshold distance and the current location of the AV further cause the at least one processor to determine a plurality of candidate local routes in the one or more roadways for each exit location of the one or more exit locations, and to determine a lowest cost candidate local route of the plurality of candidate local routes for each exit location of the one or more exit locations based on a cost associated with the one or more roadways.

In some non-limiting embodiments or aspects, the one or more instructions to determine the lowest cost candidate local route of the plurality of candidate local routes for each exit location of the one or more exit locations, further cause the at least one processor to determine at least one diversion point at which a first plurality of candidate local routes associated with a first exit location of the one or more exit locations diverges from a second plurality of candidate local routes associated with a second exit location of the one or more exit locations, to determine a first candidate local route and a second candidate local route in the first plurality of local candidate routes based on the at least one diversion point, where the first candidate local route includes one or more lanes in the one or more roadways different from at least one lane in the one or more roadways in the second candidate local route; and to determine the lowest cost candidate local route in the first plurality of candidate local routes associated with the first exit location based on a cost associated with the one or more lanes in the first candidate local route and the at least one lane in the second candidate local route.

According to some non-limiting embodiments or aspects, provided is an autonomous vehicle (AV) including a vehicle computing system including one or more processors, the vehicle computing system is configured to receive map data associated with a map of a geographic location, including one or more roadways in the geographic location, and the map data includes one or more local routes in the one or more roadways between a current location of the AV and one or more exit locations, and where the one or more exit locations are located between the current location of the AV and a destination location of the AV in a global route in the one or more roadways, to receive sensor data associated with an object detected in an environment surrounding the AV, to select a local route of the one or more local routes based on the sensor data; and control travel of the AV based on the local route.

In some non-limiting embodiments or aspects, the vehicle computing system is configured to determine a plurality of local routes in the one or more roadways between the current location of the AV and a plurality of exit locations, where the plurality of exit locations are between the current location of the AV and the destination location of the AV.

In some non-limiting embodiments or aspects, the vehicle computing system is further configured to determine a plurality of costs associated with modifying the global route between the current location of the AV and the destination location of the AV based on the plurality of local routes and the sensor data, and to determine the local route from the plurality of local routes based on the plurality of costs.

In some non-limiting embodiments or aspects, the AV further includes one or more sensors which are configured to detect the object in the environment surrounding the AV, and to provide the sensor data based on detecting the object the environment surrounding the AV.

In some non-limiting embodiments or aspects, the vehicle computing system is further configured to determine, based on the sensor data, an obstruction in a roadway of the selected local route between the current location of the AV and the one or more exit locations, to receive one or more updated local routes in the one or more roadways between the current location of the AV and one or more updated exit locations located between the current location of the AV and the destination location of the AV in the global route in the one or more roadways, to select an updated local route in the one or more updated local routes that deviates from the selected local route between the current location of the AV and the obstruction, and to control travel of the AV on the roadway based on the selected updated local route.

In some non-limiting embodiments or aspects, the vehicle computing system is further configured to determine a plurality of route elements in the selected local route, each route element in the plurality of route elements including at least one lane between the current location of the AV and an exit location of the one or more exit locations associated with the selected local route, to determine one of a linear transition or a lateral transition, the linear transition between a first lane in a first route element in the selected local route and a second lane in a second route element in the selected local route, where the linear transition in the selected local route is associated with the first route element having only one lane and the lateral transition between the first lane in the first route element in the selected local route and a second lane in the first route element in the selected local route, and the lateral transition in the selected local route is associated with the first route element having a plurality of lanes, and to control travel of the AV in the selected local route based on the linear transition and the lateral transition.

In some non-limiting embodiments or aspects, the vehicle computing system of the AV is further configured to determine, based on the map data, at least one local coverage route in one or more roadways of the selected local route, and the at least one local coverage route includes one or more of: a repetitive portion in the one or more roadways of the selected local route including one or more repeating lanes, where a traversal of the repetitive portion includes a plurality of traversals of the one or more repeating lanes; and a pass-through portion in the one or more roadways of the selected local route including one or more pass through lanes, where a traversal of the pass through portion includes a traversal of at least one predetermined lane.

In some non-limiting embodiments or aspects, the vehicle computing system of the AV is further configured to determine a progression associated with the repetitive portion in the one or more roadways of the selected local route as a sequence of lane traversals.

According to some non-limiting embodiments or aspects, provided is a method including receiving, with a computer system including one or more processors, map data associated with a map of a geographic location, where the map includes one or more roadways in the geographic location, and the map data includes one or more local routes in the one or more roadways between a current location of an autonomous vehicle (AV) and one or more exit locations, and the one or more exit locations are located between the current location of the AV and a destination location of the AV in a global route in the one or more roadways, receiving, with the computer system, sensor data associated with an object detected in an environment surrounding the AV, selecting, with the computer system, a local route of the one or more local routes based on the sensor data, and controlling, with the computer system, travel of the AV based on the selected local route.

In some non-limiting embodiments or aspects, the method further includes determining, with the computer system based on the map data, a plurality of local routes in the one or more roadways between the current location of the AV and a plurality of exit locations, where the plurality of exit locations are between the current location of the AV and the destination location of the AV.

In some non-limiting embodiments or aspects, the method further includes determining, with the computer system, a plurality of costs associated with modifying the global route between the current location of the AV and the destination location of the AV based on the plurality of local routes and the sensor data; and determining, with the computer system, the selected local route from the plurality of local routes based on the plurality of costs.

In some non-limiting embodiments or aspects, the method further includes detecting, with one or more sensors, the object in the environment surrounding the AV; and providing, with the one or more sensors, the sensor data based on detecting the object the environment surrounding the AV.

In some non-limiting embodiments or aspects, the method further includes determining, with the computer system, based on the sensor data, an obstruction in a roadway of the selected local route between the current location of the AV and the one or more exit locations, receiving, with the computer system, one or more updated local routes in the one or more roadways between the current location of the AV and one or more updated exit locations located between the current location of the AV and the destination location of the AV in the global route in the one or more roadways, selecting, with the computer system, an updated local route in the one or more updated local routes that deviates from the selected local route between the current location of the AV and the obstruction, and controlling, with the computer system, travel of the AV on the roadway based on the selected updated local route.

In some non-limiting embodiments or aspects, the method further includes determining, with the computer system, a plurality of route elements in the selected local route, each route element in the plurality of route elements including at least one lane between the current location of the AV and an exit location of the one or more exit locations associated with the selected local route; determining, with the computer system, one of a linear transition or a lateral transition, the linear transition between a first lane in a first route element in the selected local route and a second lane in a second route element in the selected local route, where the linear transition in the selected local route is associated with the first route element having only one lane, and the lateral transition between the first lane in the first route element in the selected local route and a second lane in the first route element in the selected local route, and the lateral transition in the selected local route is associated with the first route element having a plurality of lanes; and controlling, with the computer system, travel of the AV in the selected local route based on the linear transition and the lateral transition.

In some non-limiting embodiments or aspects, the method further includes determining, with the computer system, based on the map data, at least one local coverage route in one or more roadways of the selected local route, where the at least one local coverage route includes one or more of: a repetitive portion in the one or more roadways of the selected local route including one or more repeating lanes, and a traversal of the repetitive portion includes a plurality of traversals of the one or more repeating lanes; and a pass-through portion in the one or more roadways of the selected local route including one or more pass through lanes, wherein a traversal of the pass through portion includes a traversal of at least one predetermined lane.

In some non-limiting embodiments or aspects, the method further includes determining, with the computer system, a progression associated with the repetitive portion in the one or more roadways of the selected local route as a sequence of lane traversals.

According to some non-limiting embodiments or aspects, provided is a computer program product including at least one non-transitory computer-readable medium including one or more instructions that, when executed by at least one processor, cause the at least one processor to receive map data associated with a map of a geographic location, and the map includes one or more roadways in the geographic location, and the map data includes one or more local routes in the one or more roadways between a current location of the AV and one or more exit locations, and the one or more exit locations are located between the current location of the AV and a destination location of the AV in a global route in the one or more roadways, to receive sensor data associated with an object detected in an environment surrounding the AV, to select a local route of the one or more local routes based on the sensor data; and control travel of the AV based on the selected local route.

In some non-limiting embodiments or aspects, the one or more instructions further cause the at least one processor to determine, based on the map data, a plurality of local routes in the one or more roadways between the current location of the AV and a plurality of exit locations, where the plurality of exit locations are between the current location of the AV and the destination location of the AV.

In some non-limiting embodiments or aspects, the one or more instructions further cause the at least one processor to determine a plurality of costs associated with modifying the global route between the current location of the AV and the destination location of the AV based on the plurality of local routes and the sensor data; and determine the selected local route from the plurality of local routes based on the plurality of costs.

In some non-limiting embodiments or aspects, the one or more instructions further cause the at least one processor to determine a plurality of route elements in the selected local route, each route element in the plurality of route elements including at least one lane between the current location of the AV and an exit location of the one or more exit locations associated with the selected local route; determine one of a linear transition between a first lane in a first route element in the selected local route and a second lane in a second route element in the selected local route, where the linear transition in the selected local route is associated with the first route element having only one lane, and a lateral transition between the first lane in the first route element in the selected local route and a second lane in the first route element in the selected local route, and the lateral transition in the selected local route is associated with the first route element having a plurality of lanes; and control travel of the AV in the selected local route based on the linear transition and the lateral transition.

Further non-limiting embodiments or aspects are set forth in the following numbered clauses:

Clause 1. An autonomous vehicle (AV) comprising: a vehicle computing system comprising one or more processors, wherein the vehicle computing system is configured to: receive map data associated with a map of a geographic location, the map includes one or more roadways in the geographic location, and the map data includes a global route in the one or more roadways between a current location of the AV and a destination location of the AV; determine, based on the map data, one or more local routes in the one or more roadways between the current location of the AV and one or more exit locations, and the one or more exit locations are located between the current location of the AV and the destination location of the AV; and control travel of the AV based on a selected local route of the one or more local routes.

Clause 2. The AV of clause 1, wherein the vehicle computing system determining the one or more local routes in the one or more roadways between the current location of the AV and the one or more exit locations, is further configured to determine, based on the map data, a plurality of local routes in the one or more roadways between the current location of the AV and a plurality of exit locations, and the plurality of exit locations are located between the current location of the AV and the destination location of the AV.

Clause 3. The AV of any of clauses 1 and 2, wherein the vehicle computing system is further configured to determine the local route of the plurality of local routes based on sensor data associated with an object detected in an environment surrounding the AV.

Clause 4. The AV of any of clauses 1-3, wherein the vehicle computing system is further configured to determine a plurality of costs associated with modifying the global route between the current location of the AV and the destination location of the AV based on the plurality of local routes; and determine the local route of the plurality of local routes based on the plurality of costs associated with modifying the global route.

Clause 5. The AV of any of clauses 1-4, wherein the vehicle computing system is further configured to modify the global route based on the selected local route.

Clause 6. The AV of any of clauses 1-5, wherein the vehicle computing system is further configured to: determine the one or more exit locations based on a threshold distance and the current location of the AV; determine a plurality of candidate local routes in the one or more roadways for each exit location of the one or more exit locations; and determine a lowest cost candidate local route of the plurality of candidate local routes for each exit location of the one or more exit locations based on a cost associated with the one or more roadways.

Clause 7. The AV of any of clauses 1-6, wherein the vehicle computing system is further configured to determine the threshold distance of the one or more exit locations from the current location of the AV based on a sensor range of a sensor of the AV.

Clause 8. The AV of any of clauses 1-7, wherein the vehicle computer system determining the lowest cost candidate local route of the plurality of candidate local routes for each exit location of the one or more exit locations, is further configured to determine at least one diversion point at which a first plurality of candidate local routes associated with a first exit location of the one or more exit locations diverges from a second plurality of candidate local routes associated with a second exit location of the one or more exit locations, to determine a first candidate local route and a second candidate local route in the first plurality of local candidate routes based on the at least one diversion point, and the first candidate local route includes one or more lanes in the one or more roadways different from at least one lane in the one or more roadways in the second candidate local route, and to determine the lowest cost candidate local route in the first plurality of candidate local routes associated with the first exit location based on a cost associated with the one or more lanes in the first candidate local route and the at least one lane in the second candidate local route.

Clause 9. A method comprising: receiving, with a computer system comprising one or more processors, map data associated with a map of a geographic location, wherein the map includes one or more roadways in the geographic location, and wherein the map data includes a global route in the one or more roadways between a current location of an autonomous vehicle (AV) and a destination location of the AV; determining, with the computer system, based on the map data, one or more local routes in the one or more roadways between the current location of the AV and one or more exit locations, wherein the one or more exit locations are located between the current location of the AV and the destination location of the AV; and providing, with the computer system, route data associated with the one or more local routes for controlling travel of the AV on a local route of the one or more local routes.

Clause 10. The method of clause 9, wherein determining the one or more local routes in the one or more roadways between the current location of the AV and the one or more exit locations further comprises: determining, with the computer system, based on the map data, a plurality of local routes in the one or more roadways between the current location of the AV and a plurality of exit locations, wherein the plurality of exit locations are located between the current location of the AV and the destination location of the AV.

Clause 11. The method of any of clauses 9-10, further comprising: determining, with the computer system, the selected local route of the plurality of local routes based on sensor data associated with an object detected in an environment surrounding the AV.

Clause 12. The method of any of clauses 9-11, further comprising: determining, with the computer system, a plurality of costs associated with modifying the global route between the current location of the AV and the destination location of the AV based on the plurality of local routes; and determining, with the computer system, the local route of the plurality of local routes based on the plurality of costs associated with modifying the global route.

Clause 13. The method of any of clauses 9-12, further comprising: modifying, with the computer system, the global route based on the selected local route.

Clause 14. The method of any of clauses 9-13, further comprising: determining, with the computer system, the one or more exit locations based on a threshold distance and the current location of the AV; determining, with the computer system, a plurality of candidate local routes in the one or more roadways for each exit location of the one or more exit locations; and determining, with the computer system, a lowest cost candidate local route of the plurality of candidate local routes for each exit location of the one or more exit locations based on a cost associated with the one or more roadways.

Clause 15. The method of any of clauses 9-14, further comprising: determining, with the computer system, a threshold distance of the one or more exit locations from the current location of the AV based on a sensor range of a sensor of the AV.

Clause 16. The method of any of clauses 9-15, wherein determining the lowest cost candidate local route of the plurality of candidate local routes for each exit location of the one or more exit locations further comprises: determining, with the computer system, at least one diversion point at which a first plurality of candidate local routes associated with a first exit location of the one or more exit locations diverges from a second plurality of candidate local routes associated with a second exit location of the one or more exit locations; determining, with the computer system, a first candidate local route and a second candidate local route in the first plurality of local candidate routes based on the at least one diversion point, wherein the first candidate local route includes one or more lanes in the one or more roadways different from at least one lane in the one or more roadways in the second candidate local route; and determining, with the computer system, the lowest cost candidate local route in the first plurality of candidate local routes associated with the first exit location based on a cost associated with the one or more lanes in the first candidate local route and the at least one lane in the second candidate local route.

Clause 17. A computer program product comprising at least one non-transitory computer-readable medium including one or more instructions that, when executed by at least one processor, cause the at least one processor to: receive map data associated with a map of a geographic location, wherein the map includes one or more roadways in the geographic location, and wherein the map data includes a global route in the one or more roadways between a current location of an autonomous vehicle (AV) and a destination location of the AV; determine, based on the map data, one or more local routes in the one or more roadways between the current location of the AV and one or more exit locations, wherein the one or more exit locations are located between the current location of the AV and the destination location of the AV; and provide route data associated with the one or more local routes for controlling travel of the AV on a local route of the one or more local routes.

Clause 18. The computer program product of clause 17, wherein the one or more instructions determining the one or more local routes in the one or more roadways between the current location of the AV and the one or more exit locations, further cause the at least one processor to: determine, based on the map data, a plurality of local routes in the one or more roadways between the current location of the AV and a plurality of exit locations, wherein the plurality of exit locations are located between the current location of the AV and the destination location of the AV; and determine the local route of the plurality of local routes based on sensor data associated with an object detected in an environment surrounding the AV.

Clause 19. The computer program product of any of clause 17-18, wherein the one or more instructions further cause the at least one processor to: determine the one or more exit locations based on a threshold distance and the current location of the AV; determine a plurality of candidate local routes in the one or more roadways for each exit location of the one or more exit locations; and determine a lowest cost candidate local route of the plurality of candidate local routes for each exit location of the one or more exit locations based on a cost associated with the one or more roadways.

Clause 20. The computer program product of any of clauses 17-19, wherein the one or more instructions determining the lowest cost candidate local route of the plurality of candidate local routes for each exit location of the one or more exit locations, further cause the at least one processor to: determine at least one diversion point at which a first plurality of candidate local routes associated with a first exit location of the one or more exit locations diverges from a second plurality of candidate local routes associated with a second exit location of the one or more exit locations; determine a first candidate local route and a second candidate local route in the first plurality of local candidate routes based on the at least one diversion point, wherein the first candidate local route includes one or more lanes in the one or more roadways different from at least one lane in the one or more roadways in the second candidate local route; and determine the lowest cost candidate local route in the first plurality of candidate local routes associated with the first exit location based on a cost associated with the one or more lanes in the first candidate local route and the at least one lane in the second candidate local route.

Clause 21. An autonomous vehicle (AV) comprising: a vehicle computing system comprising one or more processors, wherein the vehicle computing system is configured to: receive map data associated with a map of a geographic location, wherein the map includes one or more roadways in the geographic location, wherein the map data includes one or more local routes in the one or more roadways between a current location of the AV and one or more exit locations, and wherein the one or more exit locations are located between the current location of the AV and a destination location of the AV in a global route in the one or more roadways; receive sensor data associated with an object detected in an environment surrounding the AV; select a local route of the one or more local routes based on the sensor data; and control travel of the AV based on the selected local route.

Clause 22. The AV of clause 21, wherein the vehicle computing system is further configured to: determine, based on the map data, a plurality of local routes in the one or more roadways between the current location of the AV and a plurality of exit locations, wherein the plurality of exit locations are between the current location of the AV and the destination location of the AV.

Clause 23. The AV of any of clauses 21 and 22, wherein the vehicle computing system is further configured to: determine a plurality of costs associated with modifying the global route between the current location of the AV and the destination location of the AV based on the plurality of local routes and the sensor data; and determine the selected local route from the plurality of local routes based on the plurality of costs.

Clause 24. The AV of any of clause 21-23, further comprising: one or more sensors configured to: detect the object in the environment surrounding the AV; and provide the sensor data based on detecting the object the environment surrounding the AV.

Clause 25. The AV of any of clauses 21-24, wherein the vehicle computing system is further configured to: determine, based on the sensor data, an obstruction in a roadway of the selected local route between the current location of the AV and the one or more exit locations; receive one or more updated local routes in the one or more roadways between the current location of the AV and one or more updated exit locations located between the current location of the AV and the destination location of the AV in the global route in the one or more roadways; select an updated local route in the one or more updated local routes that deviates from the selected local route between the current location of the AV and the obstruction; and control travel of the AV on the roadway based on the selected updated local route.

Clause 26. The AV of any of clauses 21-25, wherein the vehicle computing system is further configured to: determine a plurality of route elements in the selected local route, each route element in the plurality of route elements including at least one lane between the current location of the AV and an exit location of the one or more exit locations associated with the selected local route; determine one of a linear transition or a lateral transition, the linear transition between a first lane in a first route element in the selected local route and a second lane in a second route element in the selected local route, wherein the linear transition in the selected local route is associated with the first route element having only one lane, and the lateral transition between the first lane in the first route element in the selected local route and a second lane in the first route element in the selected local route, wherein the lateral transition in the selected local route is associated with the first route element having a plurality of lanes; and control travel of the AV in the selected local route based on the linear transition and the lateral transition.

Clause 27. The AV of any of clauses 21-26, wherein the vehicle computing system is further configured to: determine, based on the map data, at least one local coverage route in one or more roadways of the selected local route, wherein the at least one local coverage route includes one or more of: a repetitive portion in the one or more roadways of the selected local route including one or more repeating lanes, wherein a traversal of the repetitive portion includes a plurality of traversals of the one or more repeating lanes; and a pass-through portion in the one or more roadways of the selected local route including one or more pass through lanes, wherein a traversal of the pass through portion includes a traversal of at least one predetermined lane.

Clause 28. The AV of any of clauses 21-27, wherein the vehicle computing system is further configured to determine a progression associated with the repetitive portion in the one or more roadways of the selected local route as a sequence of lane traversals.

Clause 29. A method comprising: receiving, with a computer system comprising one or more processors, map data associated with a map of a geographic location, wherein the map includes one or more roadways in the geographic location, wherein the map data includes one or more local routes in the one or more roadways between a current location of an autonomous vehicle (AV) and one or more exit locations, and wherein the one or more exit locations are located between the current location of the AV and a destination location of the AV in a global route in the one or more roadways; receiving, with the computer system, sensor data associated with an object detected in an environment surrounding the AV; selecting, with the computer system, a local route of the one or more local routes based on the sensor data; and controlling, with the computer system, travel of the AV based on the selected local route.

Clause 30. The method clause 29, further comprising: determining, with the computer system, based on the map data, a plurality of local routes in the one or more roadways between the current location of the AV and a plurality of exit locations, wherein the plurality of exit locations are between the current location of the AV and the destination location of the AV.

Clause 31. The method of any of clauses 29 and 30, further comprising: determining, with the computer system, a plurality of costs associated with modifying the global route between the current location of the AV and the destination location of the AV based on the plurality of local routes and the sensor data; and determining, with the computer system, the selected local route from the plurality of local routes based on the plurality of costs.

Clause 32. The method of any of clauses 29-31, further comprising: detecting, with one or more sensors, an object in the environment surrounding the AV, and providing, with the one or more sensors, the sensor data based on detecting the object in the environment surrounding the AV.

Clause 33. The method of any of clauses 29-32, further comprising: determining, with the computer system, based on the sensor data, an obstruction in a roadway of the selected local route between the current location of the AV and the one or more exit locations; receiving, with the computer system, one or more updated local routes in the one or more roadways between the current location of the AV and one or more updated exit locations located between the current location of the AV and the destination location of the AV in the global route in the one or more roadways; selecting, with the computer system, an updated local route in the one or more updated local routes that deviates from the selected local route between the current location of the AV and the obstruction; and controlling, with the computer system, travel of the AV on the roadway based on the selected updated local route.

Clause 34. The method of any of clauses 29-33, further comprising: determining, with the computer system, a plurality of route elements in the selected local route, each route element in the plurality of route elements including at least one lane between the current location of the AV and an exit location of the one or more exit locations associated with the selected local route; determining, with the computer system, one of a linear transition or a lateral transition, the linear transition between a first lane in a first route element in the selected local route and a second lane in a second route element in the selected local route, wherein the linear transition in the selected local route is associated with the first route element having only one lane, and the lateral transition between the first lane in the first route element in the selected local route and a second lane in the first route element in the selected local route, wherein the lateral transition in the selected local route is associated with the first route element having a plurality of lanes; and controlling, with the computer system, travel of the AV in the selected local route based on the linear transition and the lateral transition Clause 35. The method of any of clauses 29-34, further comprising: determining, with the computer system, based on the map data, at least one local coverage route in one or more roadways of the selected local route, wherein the at least one local coverage route includes one or more of: a repetitive portion in the one or more roadways of the selected local route including one or more repeating lanes, wherein a traversal of the repetitive portion includes a plurality of traversals of the one or more repeating lanes; and a pass-through portion in the one or more roadways of the selected local route including one or more pass through lanes, wherein a traversal of the pass through portion includes a traversal of at least one predetermined lane.

Clause 36. The method of any of clauses 29-35, further comprising: determining, with the computer system, a progression associated with the repetitive portion in the one or more roadways of the selected local route as a sequence of lane traversals.

Clause 37. A computer program product comprising at least one non-transitory computer-readable medium including one or more instructions that, when executed by at least one processor, cause the at least one processor to: receive map data associated with a map of a geographic location, wherein the map includes one or more roadways in the geographic location, wherein the map data includes one or more local routes in the one or more roadways between a current location of the AV and one or more exit locations, and wherein the one or more exit locations are located between the current location of the AV and a destination location of the AV in a global route in the one or more roadways; receive sensor data associated with an object detected in an environment surrounding the AV; select a local route of the one or more local routes based on the sensor data; and control travel of the AV based on the selected local route.

Clause 38. The computer program product of clause 37, wherein the one or more instructions further cause the at least one processor to: determine, based on the map data, a plurality of local routes in the one or more roadways between the current location of the AV and a plurality of exit locations, wherein the plurality of exit locations are between the current location of the AV and the destination location of the AV.

Clause 39. The computer program product of any of clauses 37 and 38, wherein the one or more instructions further cause the at least one processor to: determine a plurality of costs associated with modifying the global route between the current location of the AV and the destination location of the AV based on the plurality of local routes and the sensor data; and determine the selected local route from the plurality of local routes based on the plurality of costs.

Clause 40. The computer program product of any of clauses 37-39, wherein the one or more instructions further cause the at least one processor to determine a plurality of route elements in the selected local route, each route element in the plurality of route elements including at least one lane between the current location of the AV and an exit location of the one or more exit locations associated with the selected local route; determine one of: a linear transition between a first lane in a first route element in the selected local route and a second lane in a second route element in the selected local route, wherein the linear transition in the selected local route is associated with the first route element having only one lane, and a lateral transition between the first lane in the first route element in the selected local route and a second lane in the first route element in the selected local route, wherein the lateral transition in the selected local route is associated with the first route element having a plurality of lanes; and control travel of the AV in the selected local route based on the linear transition and the lateral transition.

DETAILED DESCRIPTION

Figure 1:
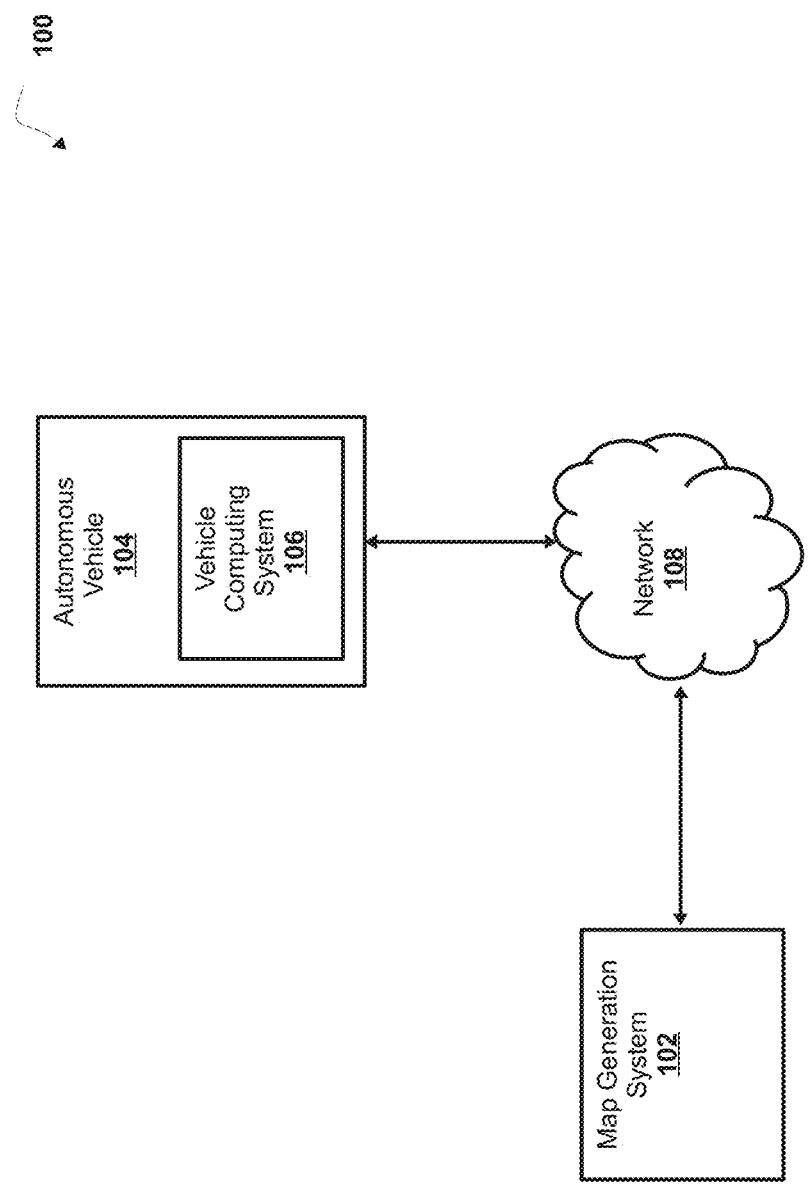
FIG. 1 is a diagram of a non-limiting embodiment of an environment in which systems and/or methods, described herein, can be implemented.

In some non-limiting embodiments, a map of a geographic location is used for routing an autonomous vehicle (AV) on one or more roadways specified in the map. For example, a global route between a starting location (e.g., a current location of the AV, a pick-up location, etc.) and a destination location is determined for the AV based on the map.

In some non-limiting embodiments, the global route between the starting location and the destination location is provided to a motion planning system of the AV for determining a motion plan of the AV based on the global route and the surrounding environment of the AV. However, communication and/or processing of the entire global route between AV systems or devices uses a relatively larger data structure that occupies and/or utilizes larger amounts of vehicle computing system resources, such as processor resources, communication resources, memory resources, and/or the like, and a processing time to determine the relatively shorter range motion plan of the AV based on the global route can be significantly increased. Further, in some non-limiting embodiments, if the motion planning system of the AV determines that the relatively shorter range motion plan of the AV deviates from the global route (e.g., based on sensor data that affects a cost function of the global route, etc.), the AV performs additional communication and/or processing in and/or between the motion planning system and other AV systems (e.g., a navigator system, etc.) that provides updates to the global route to modify the global route, which increases a latency for generating and/or applying the motion plan to control travel of the AV relative to the surrounding environment of the AV.

For example, a global route can include a global cost field that is provided to a motion planning system for determining a motion plan of the AV within the global route between the starting location and the destination location based on the surrounding environment of the AV. As an example, the global cost field can include lanes in which the AV can travel in one or more roadways, information associated with the lanes (e.g., feature data, prediction data, perception data, route data, etc.), associated costs of the lanes, paths between lanes, and/or the like that cover the entire global route (e.g., each route of a plurality of routes in the global route from the starting location to the destination location, etc.). However, in some non-limiting embodiments, an AV may not need and/or use a relatively large portion of the global route and/or the global cost field. For example, the global cost field may include a relatively large amount of data associated with lanes that may not be needed or used for motion planning and/or may not be traversed by the AV. As an example, data associated with lanes or roadways outside or external to the surrounding environment of the AV (e.g., outside a sensor range of sensor data used to determine the motion plan of the AV, outside a mid-range travel plan of the AV, etc.) may be less useful for determining the motion plan, unnecessary for determining the motion plan, and/or introduce unwanted complexity and/or errors into a process for determining the motion plan. The AV (e.g., one or more systems or devices of the AV, etc.) may receive, generate, store, process, and/or communicate such less essential or non-essential data associated with the global route and/or the global cost field. A vehicle command system and/or a navigator system of the AV may determine and/or communicate the global cost field. A motion planning system of the AV may receive, store, and/or process the global cost field to determine the relatively shorter term motion plan of the AV.

In this way, communication and/or processing of data in and/or between AV systems may involve a cumbersome amount of data and/or less relevant data that may not be needed or used by certain AV systems (e.g., a navigator system, a motion planning system, etc.). For example, determination and/or communication of the global cost field may reduce a speed at which motion planning can be provided and/or updated, as well as reduce a communication bandwidth available between AV systems, and the global cost field may not accurately and efficiently identify multiple routes to the motion planning system for determining the relatively shorter motion plan of the AV, because although the global route and/or the global cost field may be associated with multiple routes, the motion planning system may process lanes and data associated therewith that include paths which will be traversed, as well as those that will not be traversed, such that the AV may not and/or cannot use the global cost field in an efficient manner. Further, the amount of data (e.g., the amount of data associated with the global route and/or the global cost field, etc.) can add significant complexity to processing of the data by AV systems, and can obfuscate shorter term routing goals (e.g., determination of a motion plan, etc.), for example, by causing misinterpretations and/or errors in processing the data, which may cause latent errors in AV systems that use the global route and/or a motion plan determined based thereon, and/or by requiring an update of the global route and/or an approval of a deviation to the global route before these shorter term routing goals can be implemented or achieved. Accordingly, a processing time and/or a resource usage of an AV (e.g., one or more systems or devices of an AV, etc.) for routing and/or motion planning may be increased and/or rendered less efficient and/or less accurate by using a global route and/or a global cost field between the starting location and the destination location of the AV.

As disclosed herein, in some non-limiting embodiments, a map generation system and/or a vehicle computing system of an AV receives map data associated with a map of a geographic location, the map including one or more roadways in the geographic location, and the map data including a global route in the one or more roadways between a current location of the AV and a destination location of the AV. The map generation system and/or the vehicle computing system determines, based on the map data, one or more local routes in the one or more roadways between the current location of the AV and one or more exit locations, and the one or more exit locations are located between the current location of the AV and the destination location of the AV. The map generation system and/or the vehicle computing system provides route data associated with the one or more local routes for controlling travel of the AV on a selected local route of the one or more local routes. For example, the vehicle computing system controls travel of the AV based on the selected route.

As disclosed herein, in some non-limiting embodiments, a map generation system and/or a vehicle computing system of an AV receives map data associated with a map of a geographic location, the map including one or more roadways in the geographic location, the map data including one or more local routes in the one or more roadways between a current location of the AV and one or more exit locations, and the one or more exit locations are located between the current location of the AV and a destination location of the AV in a global route in the one or more roadways; receives sensor data associated with an object detected in an environment surrounding the AV; selects a local route of the one or more local routes based on the sensor data; and controls travel of the AV based on the selected local route.

In this way, communication and/or processing of data in and/or between AV systems may include a less cumbersome amount of data and/or more relevant data that can be used by AV systems (e.g., a vehicle computing system, a navigator system, a route options generator, a route options interpreter, a motion planning system, etc.) in a more efficient manner. For example, a speed at which route options can be provided and/or updated may be increased and/or a communication bandwidth available between AV systems may be increased, and route options may more accurately and efficiently identify multiple route options to the motion planning system for determining the relatively shorter motion plan of the AV, such that the AV can use the route options in a more efficient manner. Further, a complexity, errors, and/or a latency associated with processing of the data by AV systems (e.g., determination of a motion plan, etc.) may be reduced. Accordingly, a processing time and/or a resource usage of an AV (e.g., one or more systems or devices of an AV, etc.) for routing and/or motion planning may be reduced and/or rendered more efficient and/or more accurate.

Referring now to FIG. 1, FIG. 1 is a diagram of a non-limiting embodiment of an environment 100 in which systems and/or methods, described herein, can be implemented. As shown in FIG. 1, environment 100 includes map generation system 102, autonomous vehicle 104 including vehicle computing system 106, and network 108. Systems and/or devices of environment 100 can interconnect via wired connections, wireless connections, or a combination of wired and wireless connections.

In some non-limiting embodiments, map generation system 102 and/or autonomous vehicle 104 include one or more devices capable of receiving, storing, and/or providing map data (e.g., map data, AV map data, coverage map data, hybrid map data, submap data, etc.) associated with a map (e.g., a map, a submap, an AV map, a coverage map, a hybrid map, etc.) of a geographic location (e.g., a country, a state, a city, a portion of a city, a township, a portion of a township, etc.). For example, maps can be used for routing autonomous vehicle 104 on a roadway specified in the map.

In some non-limiting embodiments, map data includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. In some non-limiting embodiments, a map of a geographic location includes one or more routes that include one or more roadways. In some non-limiting embodiments, map data associated with a map of the geographic location associates roadways of the one or more roadways with an indication of whether an AV can travel on that roadway.

In some non-limiting embodiments, a road refers to a paved or otherwise improved path between two places that allows for travel by a vehicle (e.g., autonomous vehicle 104). Additionally, or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally, or alternatively, a roadway (e.g., one or more roadway segments) includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example, a lane of a roadway is connected to another lane of the roadway and/or a lane of the roadway is connected to a lane of another roadway.

In some non-limiting embodiments, autonomous vehicle 104 and/or vehicle computing system 106 includes one or more devices capable of receiving map data associated with a map of a geographic location, the map including one or more roadways in the geographic location, and the map data including a global route in the one or more roadways between a current location of the AV and a destination location of the AV; determining, based on the map data, one or more local routes in the one or more roadways between the current location of the AV and one or more exit locations, the one or more exit locations being located between the current location of the AV and the destination location of the AV; providing route data associated with the one or more local routes for controlling travel of the AV on a selected local route of the one or more local routes; and controlling travel of the AV based on the selected route. For example, autonomous vehicle 104 and/or vehicle computing system 106 can include one or more computing systems, including one or more processors (e.g., one or more servers, etc.). Further details regarding non-limiting embodiments of autonomous vehicle 104 are provided below with regard to FIG. 2.

In some non-limiting embodiments, network 108 includes one or more wired and/or wireless networks. For example, network 108 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

In some non-limiting embodiments, map generation system 102 includes a cloud computing network (e.g., a cloud platform) for providing services from a remote location. For example, the cloud platform system extends the security, manageability, and service of a local network, (e.g., enterprise network) into a cloud infrastructure network, enabling cloud infrastructure to be interfaced as if it were on a local network (e.g., enterprise network). The cloud platform may provide an interface to cloud infrastructure that enable existing enterprise systems to manage cloud infrastructure substantially the same as they manage local machines via common application programming interfaces.

In some non-limiting embodiments, map generation system 102 includes a platform for providing services for an application platform, such as a transportation platform, a ride sharing platform, a delivery service platform, a courier service platform, and/or the like, and includes one or more devices capable of communicating with a user device to provide user access to an application platform. As an example, map generation system 102 communicates with autonomous vehicle 104 to provision services associated with an application platform, such as a transportation platform, a ride sharing platform, a delivery service platform, a courier service platform, and/or other service platforms. In some non-limiting embodiments, map generation system 102 is associated with a central operations system and/or an entity associated with autonomous vehicle 104 and/or an application platform, as an example, an AV owner, an AV manager, a fleet operator, a service provider, and/or the like.

The number and arrangement of systems, devices, and networks shown in FIG. 1 are provided as an example. There can be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
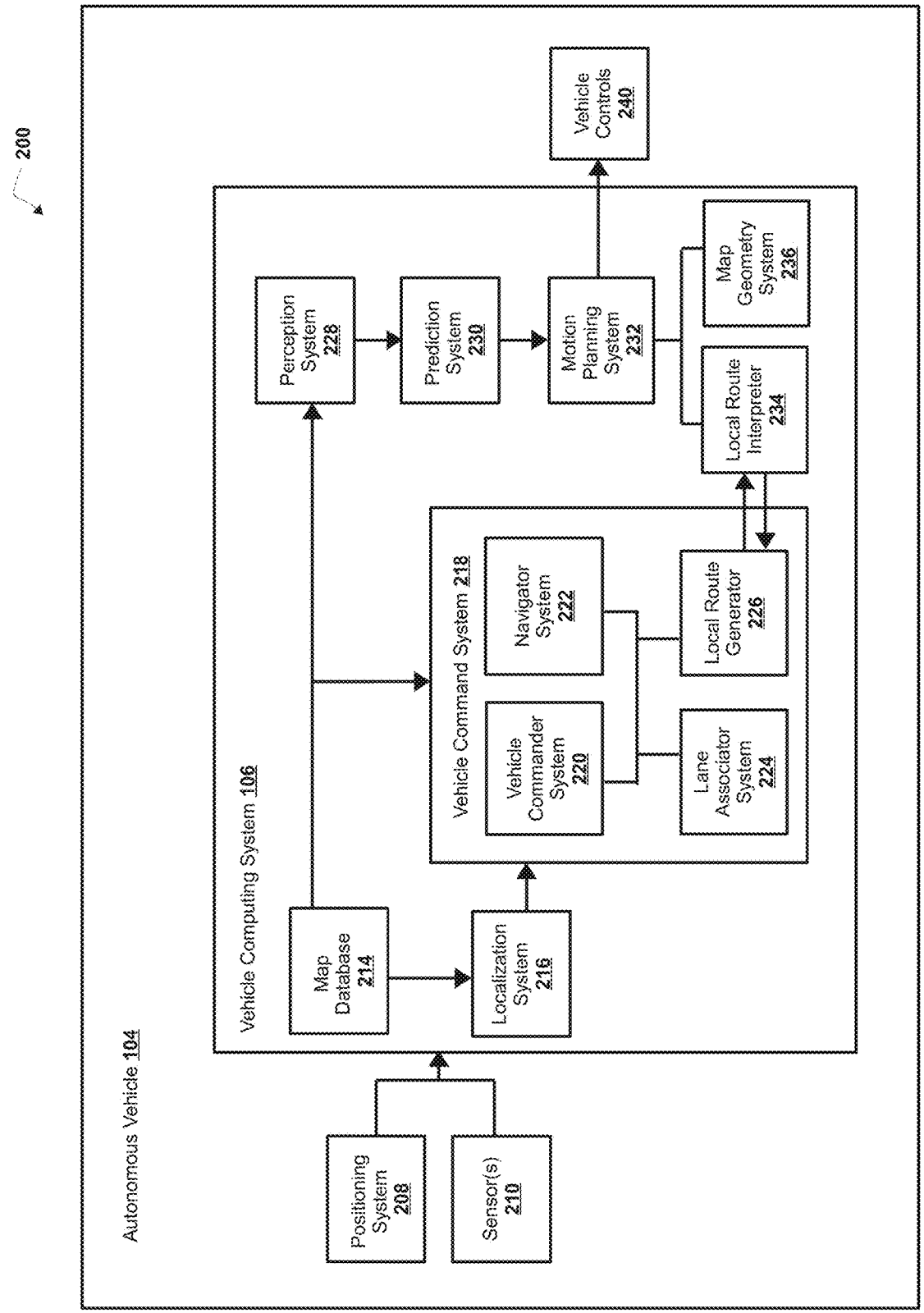
FIG. 2 is a diagram of a non-limiting embodiment of a system for controlling an autonomous vehicle shown in FIG. 1.

Referring now to FIG. 2, FIG. 2 is a diagram of a non-limiting embodiment of a system 200 for controlling autonomous vehicle 104. As shown in FIG. 2, vehicle computing system 106 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments, vehicle computing system 106 is connected to or includes positioning system 208. In some non-limiting embodiments, positioning system 208 determines a position (e.g., a current position, a past position, etc.) of autonomous vehicle 104. In some non-limiting embodiments, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments, the position of autonomous vehicle 104 is used by vehicle computing system 106.

In some non-limiting embodiments, vehicle computing system 106 receives sensor data from one or more sensors 210 that are coupled to or otherwise included in autonomous vehicle 104. For example, one or more sensors 210 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments, the sensor data includes data that describes a location of objects within the surrounding environment of autonomous vehicle 104. In some non-limiting embodiments, one or more sensors 210 collect sensor data that includes data that describes a location (e.g., in three-dimensional space relative to autonomous vehicle 104) of points that correspond to objects within the surrounding environment of autonomous vehicle 104.

In some non-limiting embodiments, the sensor data includes a location (e.g., a location in three-dimensional space relative to the LIDAR system) of a number of points (e.g., a point cloud) that correspond to objects that have reflected a ranging laser. In some non-limiting embodiments, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments, the sensor data includes a location (e.g., a location in three-dimensional space relative to the RADAR system) of a number of points that correspond to objects that have reflected a ranging radio wave. In some non-limiting embodiments, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments, the RADAR system provides information about the location and/or the speed of an object relative to the RADAR system based on the radio waves.

In some non-limiting embodiments, image processing techniques (e.g., range imaging techniques, as an example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments, map database 214 provides detailed information associated with the map, features of the roadway in the geographic location, and information about the surrounding environment of autonomous vehicle 104 for the autonomous vehicle to use while driving (e.g., traversing a route, planning a route, determining a motion plan, controlling the autonomous vehicle, etc.).

In some non-limiting embodiments, vehicle computing system 106 receives a vehicle pose from localization system 216 based on one or more sensors 210 that are coupled to or otherwise included in autonomous vehicle 104. In some non-limiting embodiments, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer, for determining a map-relative vehicle pose. For example, low quality pose localizer determines a low quality pose estimate in response to receiving position data from positioning system 208 for operating (e.g., routing, navigating, controlling, etc.) autonomous vehicle 104 under manual control (e.g., in a coverage lane). In some non-limiting embodiments, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane).

In some non-limiting embodiments vehicle command system 218 includes vehicle commander system 220, navigator system 222, lane associator system 224, and local route generator 226, that cooperate to route and/or navigate autonomous vehicle 104 in a geographic location. In some non-limiting embodiments, vehicle commander system 220 provides tracking of a current objective of autonomous vehicle 104, such as, a current service, a target pose, a coverage plan (e.g., development testing, etc.), and/or the like. In some non-limiting embodiments, navigator system 222 determines and/or provides a route plan (e.g., a route between a starting location or a current location and a destination location, etc.) for autonomous vehicle 104 based on a current state of autonomous vehicle 104, map data (e.g., lane graph, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) in one or more roadways that autonomous vehicle 104 can traverse on a route to a destination location (e.g., a target location, a trip drop-off location, etc.).

In some non-limiting embodiments, navigator system 222 determines a route plan based on one or more lanes received from lane associator system 224. In some non-limiting embodiments, lane associator system 224 determines one or more lanes of a route in response to receiving a vehicle pose from localization system 216. For example, lane associator system 224 determines, based on the vehicle pose, that autonomous vehicle 104 is on a coverage lane, and in response to determining that autonomous vehicle 104 is on the coverage lane, determines one or more candidate lanes (e.g., routable lanes) within a distance of the vehicle pose associated with autonomous vehicle 104. For example, lane associator system 224 determines, based on the vehicle pose, that autonomous vehicle 104 is on an AV lane, and in response to determining that autonomous vehicle 104 is on the AV lane, determines one or more candidate lanes (e.g., routable lanes) within a distance of the vehicle pose associated with autonomous vehicle 104. In some non-limiting embodiments, navigator system 222 generates a cost function for each of the one or more candidate lanes that autonomous vehicle 104 may traverse on a route to a destination location. For example, navigator system 222 generates a cost function that describes a cost (e.g., a cost over a time period) of following (e.g., adhering to) one or more lanes that may be used to reach the destination location (e.g., a target pose, etc.).

In some non-limiting embodiments, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments, local route generator 226 may determine a number of route options based on a predetermined number, a current location of the AV, a current service of the AV, and/or the like.

In some non-limiting embodiments, perception system 228 detects and/or tracks objects (e.g., vehicles, pedestrians, bicycles, and the like) that are proximate to (e.g., in proximity to the surrounding environment of) autonomous vehicle 104 over a time period. In some non-limiting embodiments, perception system 228 can retrieve (e.g., obtain) map data from map database 214 that provides detailed information about the surrounding environment of autonomous vehicle 104.

In some non-limiting embodiments, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments, perception system 228 determines state data for an object over a number of iterations of determining state data. For example, perception system 228 updates the state data for each object of a plurality of objects during each iteration.

In some non-limiting embodiments, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments, prediction system 230 predicts that an object will adhere to the object's direction of travel according to the speed of the object. In some non-limiting embodiments, prediction system 230 uses machine learning techniques or modeling techniques to make a prediction based on state data associated with an object.

In some non-limiting embodiments, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments, motion planning system 232 receives a route plan as a command from navigator system 222. In some non-limiting embodiments, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments, motion planning system 232 determines a cost of following a motion plan. For example, motion planning system 232 determines a motion plan for autonomous vehicle 104 based on one or more cost functions. In some non-limiting embodiments, motion planning system 232 determines a motion plan (e.g., a selected motion plan, an optimized motion plan, a preferred motion plan, etc.) that minimizes a cost function. In some non-limiting embodiments, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments, motion planning system 232 communicates with local route interpreter 234 and map geometry system 236. In some non-limiting embodiments, local route interpreter 234 may receive and/or process route options from local route generator 226. For example, local route interpreter 234 may determine a new or updated route for travel of autonomous vehicle 104. As an example, one or more lanes in a local route may be determined by local route interpreter 234 and map geometry system 236. For example, local route interpreter 234 can determine a route option and map geometry system 236 determines one or more lanes in the route option for controlling motion of autonomous vehicle 104.

Figure 3:
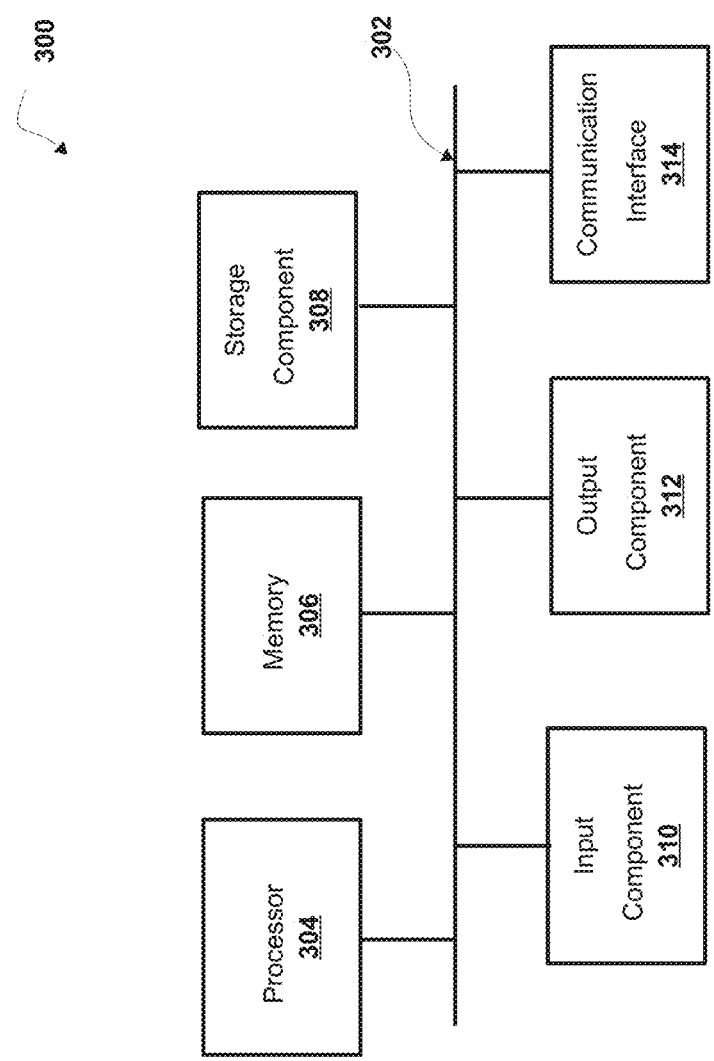
FIG. 3 is a diagram of a non-limiting embodiment of components of one or more devices of FIGS. 1 and 2.

Referring now to FIG. 3, FIG. 3 is a diagram of example components of a device 300. Device 300 can correspond to one or more devices of map generation system 102 and/or one or more devices (e.g., one or more devices of a system of) autonomous vehicle 104. In some non-limiting embodiments, one or more devices of map generation system 102 and/or one or more devices (e.g., one or more devices of a system) of autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
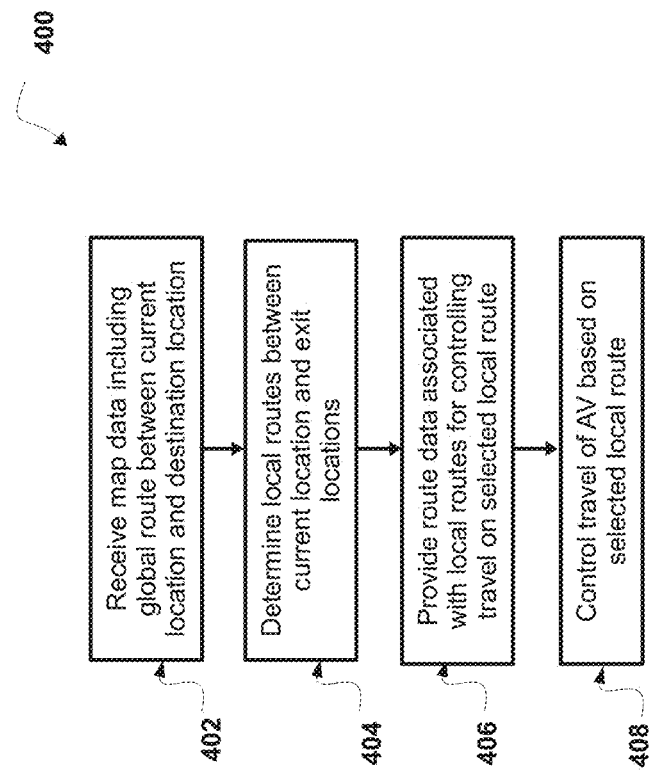
FIG. 4 is a flowchart of a non-limiting embodiment of a process for determining a route.

Referring now to FIG. 4, FIG. 4 is a flowchart of a non-limiting embodiment of a process 400 for determining a route, such as, a process for controlling an AV on a local route, and/or the like. In some non-limiting embodiments, one or more of the steps of process 400 are performed (e.g., completely, partially, etc.) by autonomous vehicle 104 (e.g., one or more devices of autonomous vehicle 104, one or more devices of vehicle computing system 106, etc.). In some non-limiting embodiments, one or more of the steps of process 400 are performed (e.g., completely, partially, etc.) by another device or a group of devices separate from or including autonomous vehicle 104, such as map generation system 102 (e.g., one or more devices of map generation system 102, etc.).

As shown in FIG. 4, at step 402, process 400 includes receiving map data associated with a map of a geographic location including a global route in one or more roadways between a current location of an AV and a destination location of the AV. For example, map generation system 102 and/or autonomous vehicle 104 (e.g., vehicle computing system 106, etc.) receives map data associated with a map of a geographic location, wherein the map data includes a global route between a starting location associated with autonomous vehicle 104 (e.g., a current location of autonomous vehicle 104, a pickup location, etc.) and a destination location associated with autonomous vehicle 104 (e.g., a target location of autonomous vehicle 104, a drop-off location, etc.). As an example, map generation system 102 and/or autonomous vehicle 104 (e.g., vehicle computing system 106, etc.) receives the map data from a database located and/or implemented in map generation system 102, a database associated with map generation system 102, a database remote from map generation system 102, a database associated with autonomous vehicle 104, a database located and/or implemented in autonomous vehicle 104 (e.g., map database 214, etc.), a database remote from autonomous vehicle 104, and/or the like.

In some non-limiting embodiments, map generation system 102 and/or vehicle computing system 106 receive map data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., a location and/or direction of a travel lane, a parking lane, a turning lane, a bicycle lane, etc.), data associated with traffic control of a road (e.g., a location of and/or instructions associated with lane markings, traffic signs, traffic lights, etc.), and/or the like. According to some non-limiting embodiments, a map of a geographic location includes one or more routes that include one or more roadways. According to some non-limiting embodiments, map data associated with a map of the geographic location associates the one or more roadways with an indication of whether an AV can travel on that roadway.

In some non-limiting embodiments, a road refers to a paved or otherwise improved path between two places or locations that allows for travel by a vehicle (e.g., autonomous vehicle 104). Additionally, or alternatively, a road includes a roadway and a sidewalk in proximity to (e.g., adjacent, near, next to, touching, etc.) the roadway. In some non-limiting embodiments, a roadway includes a portion of a road on which a vehicle is intended to travel and is not restricted by a physical barrier or by separation so that the vehicle is able to travel laterally. Additionally, or alternatively, a roadway (e.g., one or more roadway segments) includes one or more lanes in which a vehicle may operate, such as a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally, or alternatively, a roadway (e.g., one or more roadway segments) includes one or more lanes in which a pedestrian, a bicycle or another vehicle may travel, such as a crosswalk, a bicycle lane (e.g., a lane in which a bicycle travels), a mass transit lane (e.g., a lane in which a bus and/or the like may travel), and/or the like. According to some non-limiting embodiments, a roadway is connected to another roadway, for example, a lane of a roadway is connected to another lane of the roadway and/or a lane of the roadway is connected to a lane of another roadway.

In some non-limiting embodiments, a roadway is associated with map data (e.g., map data, submap data, etc.) that defines one or more attributes of (e.g., metadata associated with) the roadway (e.g., attributes of a roadway in a geographic location, attributes of a segment or extent of a roadway, attributes of a lane of a roadway, etc.). In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

In some non-limiting embodiments, map data includes sensor data associated with and/or provided from one or more sensors. For example, map data may include Light Detection and Ranging (LIDAR) point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, map data associated with a map may include LIDAR point cloud data that represents objects and distances between objects in the geographic location of a map. Additionally, or alternatively, map data associated with a map may include LIDAR point cloud data that represents objects in the roadway, such as lane markers, road edges, and/or the like. According to some non-limiting embodiments, the map data includes lane information for lanes on which autonomous vehicle 104 can travel in one or more roadways (e.g., feature data, prediction data, perception data, route data, etc.), paths between lanes, and/or the like, that cover an entire global route (e.g., each route of a plurality of routes in the global route from the starting location to the destination location, etc.).

In some non-limiting embodiments, map data includes global route data associated with a global route (e.g., an entire or full route between a starting location and a destination location, a route plan, an organic route between a starting location and a destination location, etc.) of an autonomous vehicle 104. For example, vehicle computing system 106 receives global route data associated with a global route of an autonomous vehicle 104, including one or more lanes of one or more roadways in the global route, information associated with the one or more lanes (e.g., lane connectivity information, lane identifiers, etc.), a cost field associated with the global route, and/or the like. As an example, vehicle computing system 106 receives map data, including one or more lanes of one or more roadways, that are connected to each other (e.g., interconnected, etc.) and can be arranged to form a global route between a starting location and a destination location. In such an example, vehicle computing system 106 may receive map data, including a global route associated with each route of a plurality of routes in a geographic location between a starting location and a destination location.

In some non-limiting embodiments, a global route includes a cost field (e.g., a global cost field, etc.) for one or more roadways of the global route. For example, a cost field refers to a cost (e.g., values representing a cost for traversing a roadway, values representing a cost for traversing a segment of a roadway, values representing a cost for traversing one or more lanes of a roadway, etc.) associated with traversing a roadway (e.g., one or more travel lanes, etc.) in a global route and connectivity information (e.g., connections between lanes in the global route, etc.) for the one or more roadways or lanes. According to some non-limiting embodiments, a cost field includes a cost for traversing one or more roadways that are not in a global route. For example, a cost field includes a cost for traversing one or more roadways not in the global route that are interconnected (e.g., connected together) with the global route. For example, a cost field includes a cost for one or more lanes not in the global route to be used by an autonomous vehicle 104 in an alternative route (e.g., a route including one or more roadways or lanes outside the global route, etc.).

In some non-limiting embodiments, a cost field may be received by map generation system 102 and/or vehicle computing system 106 to determine a local route for an autonomous vehicle 104 in one or more roadways of the cost field. For example, vehicle computing system 106 receives map data, including a cost field for one or more local routes of an autonomous vehicle 104 interconnected with the global route. For example, vehicle computing system 106 receives a cost field, including a cost for one or more lanes (e.g., each lane) of one or more interconnecting roadways in the global route.

In some non-limiting embodiments, a cost field may not refer to a cost for one or more routes (e.g., each route) in a plurality of routes of the geographic location. For example, a cost field may not include a cost for one or more lanes of a roadway in a local route when the one or more lanes of the roadway may not be traversed by an autonomous vehicle 104 (e.g., outside a sensor horizon (e.g., sensor range) of sensor data used to determine the motion plan of the AV includes one or more lanes which are forbidden, etc.), and/or the one or more lanes of the roadway are outside a mid-range travel plan of an autonomous vehicle 104 (e.g., beyond one or more exit locations, etc.).

In some non-limiting embodiments, a cost field includes one or more lanes of one or more roadways that are associated with one or more costs (e.g., a sequence of costs associated with a sequence of roadways, etc.). For example, the vehicle computing system 106 receives map data including a cost field for determining a plurality of costs forming a sequence of costs for a local route. For example, vehicle computing system 106 determines a local route, including a sequence of costs decreasing for one or more subsequent lanes (e.g., each lane in a local route in an order of traversal, etc.) of the one or more lanes from a cost associated with a starting location to a cost associated with a destination location. For example, the vehicle computer system 106 receives map data for determining a route, including a cost in a cost field which is greater for a lane closer to a starting location than a cost for a lane closer to a destination location. In some non-limiting embodiments, a lane in the global route may have a cost in a cost field that is less than a cost in a cost field for a lane not in the global route.

In some non-limiting embodiments, map generation system 102 and/or vehicle computing system 106 receives map data, including connectivity information associated with one or more lanes of a roadway for determining a lane transition (e.g., a linear transition between sequential lanes, a lateral transition between parallel lanes, etc.) between the one or more lanes. For example, vehicle computing system 106 receives a cost field, including lane connectivity information for controlling an autonomous vehicle 104 (e.g., before, during, after, etc.) on a trajectory (e.g., a path) between the one or more lanes (e.g., a lateral transition from a first lane to a second lane, a linear transition from a first lane to a second lane, a lane merger from a first lane into a second lane, a lane taper, and/or the like).

As further shown in FIG. 4, at step 404, process 400 includes determining, based on the map data, one or more local routes in the one or more roadways between a starting location and one or more exit locations, wherein the one or more exit locations are located between the starting location of the AV and the destination location of the AV. For example, map generation system 102 and/or autonomous vehicle 104 (e.g., vehicle computing system 106, etc.) determines, based on the map data, a plurality of local routes (e.g., a route option in a global cost field, a portion of a global route, an alternative to a global route, etc.) in one or more roadways between a starting location of autonomous vehicle 104 (e.g., a current location of autonomous vehicle 104, etc.) and a plurality of exit locations that are located between a starting location of the AV and a destination location of the AV.

In some non-limiting embodiments, map generation system 102 and/or vehicle computing system 106 determines one or more local routes, based on one or more exit locations in a cost field associated with a global route (e.g., a portion of a global cost field, a subsection of a global cost field, etc.). For example, vehicle computing system 106 determines one or more local routes, including one or more lanes (e.g., a route lane, an alternative lane, a preferred lane, etc.) in a cost field associated with a global route. According to some non-limiting embodiments, vehicle computing system 106 determines one or more local routes in a cost field associated with the global route, including one or more lanes not in the global route.

In some non-limiting embodiments, map generation system 102 and/or vehicle computing system 106 determines one or more local routes, including one or more lanes in a segment of a roadway between a starting location and an exit location. For example, the one or more local routes may include one or more route elements, including the one or more lanes that are associated with one or more segments of a roadway between a starting location and an exit location.

According to some non-limiting embodiments, one or more route elements form a sequence of route elements in a local route, and each route element includes at least one lane. Additionally, or alternatively, a route element may refer to one or more neighbor lanes in a corresponding roadway segment.

In some non-limiting embodiments, map generation system 102 and/or vehicle computing system 106 determines a local route, including one or more route elements associated with a cost field in a global route. For example, vehicle computing system 106 determines one or more route elements of one or more local routes, including one or more lanes (e.g., a route lane, an alternative lane, a preferred lane, etc.) in a segment of the roadway. For example, a route lane may refer to a lane that may be traversed by autonomous vehicle 104 in a local route, an alternative lane may refer to a lane that may not be traversed unless autonomous vehicle 104 determines to not use a route lane, a preferred lane may refer to a lane that may be optimized for use in the local route.

In some non-limiting embodiments, map generation system 102 and/or vehicle computing system 106 determines one or more local routes, based on cost field information of a global route. As an example, the one or more local routes include lane connectivity information, a cost to traverse a lane, a cost to traverse a local route and/or the like, based on cost field information associated with the global route. For example, vehicle computing system 106 may determine a local route, including one or more lanes of a roadway in a cost field of the global route that autonomous vehicle 104 may operate on in the global route.

In some non-limiting embodiments, map generation system 102 and/or vehicle computing system 106 determines a local route, including costs of roadways or lanes in the local route, based on a cost field associated with the global route. For example, vehicle computing system 106, when determining a local route, determines a cost associated with traversing the local route, based on a cost for traversing each roadway or lane in a cost field of the global route. As an example, vehicle computing system 106 determines a cost for a local route based on a cost for one or more lanes of a roadway in the local route (e.g., each lane in the local route, etc.). According to some non-limiting embodiments, a local route may refer to a cost for traversing one or more lanes of a roadway that may not be in a global route. For example, the local route may refer to at least one roadway associated with a cost that may not be in the cost associated with traversing the global route. As a further example, a local route may include lanes that are in the cost field, but are not in the global route (e.g., a lane used by an autonomous vehicle 104 to change lanes, a lane used to diverge from a route plan before an obstacle in a roadway, etc.). Additionally, or alternatively, vehicle computing system 106, when determining the one or more local routes, may not include one or more lanes of a roadway for a route when a threshold number of routes have been determined.

In some non-limiting embodiments, a cost field may be used by map generation system 102 and/or vehicle computing system 106 to determine one or more local routes for controlling autonomous vehicle 104 in one or more roadways of the global route. For example, map generation system 102 and/or vehicle computing system 106 determines a local route in a global route by determining a cost for a lane in a local route, based on a cost for the lane in a cost field of the global route.

In some non-limiting embodiments, map generation system 102 and/or vehicle computing system 106 determines a local route having a lane transition. For example, vehicle computing system 106 determines a local route for controlling an autonomous vehicle 104 (e.g., before, during, after, etc.) in a lane transition (e.g., a lateral transition from a first lane to a second lane, a linear transition from a first lane to a second lane, a lane merger from a first lane into a second lane, a taper of a lane, and/or the like).

In some non-limiting embodiments, map generation system 102 and/or vehicle computing system 106 determines a local route, including an identifier of one or more lanes and a cost for autonomous vehicle 104 to transition to and/or from the one or more lanes in the local route. For example, vehicle computing system 106 determines the local route, including a cost for one or more lane transitions in a segment of a roadway in which an autonomous vehicle 104 may travel. In some non-limiting embodiments, a local route includes a transition for autonomous vehicle 104 to provide an alternative lane for a lane transition in a local route. According to some non-limiting embodiments, autonomous vehicle 104 includes a roadway identifier (e.g., a lane identifier, a road segment identifier, a route element identifier) for identifying a next roadway (e.g., a lane to traverse after the current lane) in a local route, and a cost for planning a transition to the next roadway.

In some non-limiting embodiments, map generation system 102 and/or vehicle computing system 106 determines a local route, including a plurality of lanes of one or more roadways that are associated with a cost (e.g., a sequence of route elements, a sequence of costs, etc.). As an example, vehicle computing system 106 determines a plurality of costs in a cost field that forms a sequence of costs for a local route. For example, the sequence of costs may decrease from a cost associated with a starting location to a cost associated with a destination location for subsequent lanes of the one or more lanes in the route. For example, vehicle computing system 106 determines a route, including a cost in a cost field which is greater for a lane closer to a starting location than a cost for a lane closer to an exit location.

In some non-limiting embodiments, map generation system 102 and/or vehicle computing system 106 determines one or more exit locations that are located in one or more roadways at a distance from the starting location. For example, vehicle computing system 106 determines an exit location of the global route at a predetermined distance (e.g., a threshold distance from the starting location, a threshold distance from autonomous vehicle 104, etc.). In another example, vehicle computing system 106 may determine an exit location in a global route, based on a sensor horizon (e.g., a sensor range associated with one or more sensors in autonomous vehicle 104, etc.). For example, vehicle computing system 106 may determine an exit location in the global route, based on an exit horizon at a distance from the sensor horizon. According to some non-limiting embodiments, an autonomous vehicle 104 may determine a new local route before reaching an exit location, an exit horizon, and/or a sensor horizon.

In some non-limiting embodiments, map generation system 102 and/or vehicle computing system 106 determines a plurality of costs associated with modifying the global route between the current location of the AV and the destination location of the AV, based on the plurality of local routes. For example, vehicle computing system 106 determines an updated cost field associated with a modified global route (e.g., updated) between the current location and the destination location while determining a plurality of local routes. According to some non-limiting embodiments, vehicle computing system 106 determines a plurality of routes for controlling an autonomous vehicle 104, including determining a plurality of costs in a cost field associated with a modified global route. In some non-limiting embodiments, vehicle computing system 106, determines a plurality of costs associated with modifying one or more lanes associated with the global route between the current location of the AV and the destination location of the AV, based on a selected route of the plurality of local routes.

In some non-limiting embodiments, map generation system 102 and/or vehicle computing system 106 determines a selected local route of the plurality of local routes, based on the plurality of costs associated with modifying the global route. For example, vehicle computing system 106 determines the selected local route of the plurality of local routes, based on sensor data associated with an object detected in an environment surrounding the AV. According to some non-limiting embodiments, vehicle computing system 106 determines the selected local route of the plurality of local routes, based on sensor data from one or more sensors. As an example, vehicle computing system 106 determines the selected local route of the plurality of local routes, based on sensor data from one or more sensors of an autonomous vehicle 104 that correspond to objects that have reflected a ranging laser of one or more mapping vehicles in a geographic location. As an example, vehicle computing system 106 determines the selected local route of the plurality of local routes, based on LIDAR point cloud data that represents objects and distances between objects in the geographic location. Additionally, or alternatively, vehicle computing system 106 determines the selected local route of the plurality of local routes, based on LIDAR point cloud data that represents objects in the roadway, such as lane markers, road edges, and/or the like. According to some non-limiting embodiments, the LIDAR point cloud data includes lane information for lanes on which autonomous vehicle 104 can travel in one or more roadways (e.g., feature data, prediction data, perception data, route data, etc.), trajectories between lanes, and/or the like that cover the entire global route (e.g., each route of a plurality of routes in the global route from the starting location to the destination location, etc.).

In some non-limiting embodiments, map generation system 102 and/or vehicle computing system 106 determines an order of a plurality of local routes between a starting location and a destination location. For example, vehicle computing system 106 sorts the plurality of local routes according to a cost (e.g., a goal cost, a local route cost, a final path to goal cost, etc.).

Further details regarding step 404 of process 400 are provided below with regard to FIG. 5.

As further shown in FIG. 4, at step 406, process 400 includes controlling travel of the AV, based on a selected local route of the one or more local routes. For example, autonomous vehicle 104 (e.g., vehicle computing system 106, etc.) controls autonomous vehicle 104, based on a selected local route of the one or more local routes. As a an example, vehicle computing system 106 controls autonomous vehicle 104 to operate on a local route between a starting location and exit location, based on a selected local route in the plurality of local routes determined from a cost field associated with a global route to the destination location.

In some non-limiting embodiments, map generation system 102 and/or vehicle computing system 106 controls autonomous vehicle 104 on a selected local route, based on a global route between a starting location and a destination location that is provided to a motion planning system of autonomous vehicle 104 for determining a motion plan of autonomous vehicle 104.

In some non-limiting embodiments, map generation system 102 and/or vehicle computing system 106 controls travel of the AV, based on a selected local route of the one or more local routes. For example, the selected local route of the one or more local routes may include a short range motion plan of autonomous vehicle 104 that deviates from the global route (e.g., based on sensor data that affects a cost function of the global route, based on a local route cost that affects efficiency, based on a user preference, etc.). For example, vehicle computing system 106 controls autonomous vehicle 104 on a selected local route of the one or more local routes in an updated local route alternative to the destination of the global route and modifies the global route in an efficient manner. As an example, vehicle computing system 106 may control autonomous vehicle 104, based on sensor data associated with lanes or roadways, by determining an updated local route in the surrounding environment of autonomous vehicle 104. According to some non-limiting embodiments, vehicle computing system 106 may not control autonomous vehicle 104, based on data associated with lanes or roadways outside or external to the surrounding environment of the AV (e.g., outside a sensor horizon (e.g., a sensor range) of sensor data used to determine the motion plan of the AV, outside a mid-range travel plan of the AV, etc.) as it may be less useful for determining the motion plan, unnecessary for determining the motion plan, and/or introduce unwanted complexity and/or errors into a process for determining the motion plan.

According to some non-limiting embodiments, map generation system 102 and/or vehicle computing system 106 controls an autonomous vehicle 104 on a selected local route of a plurality of local routes, based on a global cost field to accurately and efficiently identify a local route to the motion planning system for determining a relatively shorter motion plan of autonomous vehicle 104. For example, the selected local route of the plurality of local routes provides shorter term routing goals that can be accurately implemented or achieved. Accordingly, a processing time and/or a resource usage of an AV (e.g., one or more systems or devices of an AV, etc.) for routing and/or motion planning may be rendered more efficient and/or more accurate by using a selected local route of the plurality of local routes to control travel of an autonomous vehicle 104 between a starting location and a destination location of the AV.

Figure 5:
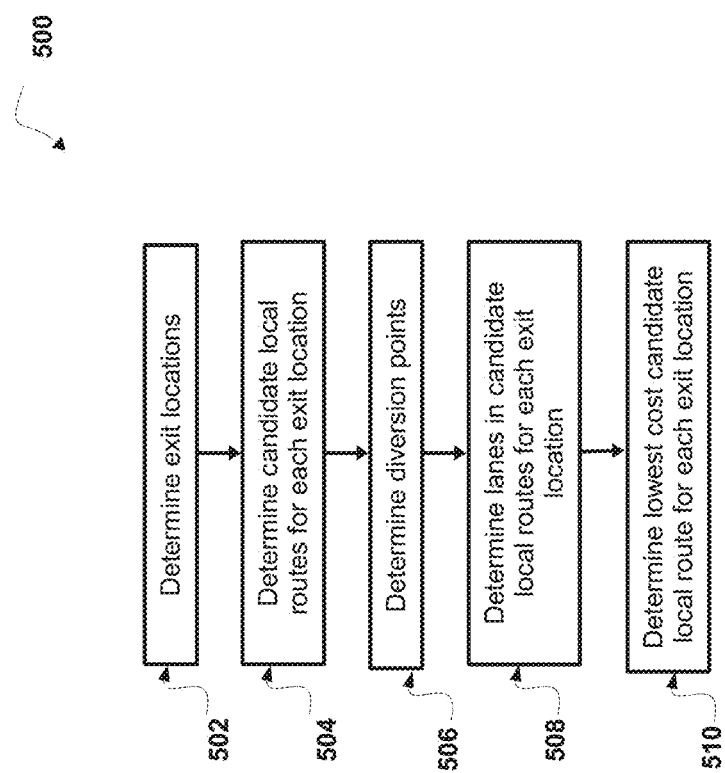
FIG. 5 is a flowchart of a non-limiting embodiment of a process for determining a route.

Referring now to FIG. 5, FIG. 5 is a flowchart of a non-limiting embodiment of a process 500 relating to a process for controlling an AV on a local route. In some non-limiting embodiments, one or more of the steps of process 500 are performed (e.g., completely, partially, etc.) by autonomous vehicle 104 (e.g., one or more devices of autonomous vehicle 104, one or more devices of vehicle computing system 106, etc.). In some non-limiting embodiments, one or more of the steps of process 500 are performed (e.g., completely, partially, etc.) by another device or a group of devices separate from or including autonomous vehicle 104, such as map generation system 102 (e.g., one or more devices of map generation system 102, etc.).

As shown in FIG. 5, at step 502, process 500 includes determining one or more exit locations based on a threshold distance and the current location of the AV. For example, map generation system 102 and/or vehicle computing system 106 determines one or more exit locations based on a threshold distance and the current location of the AV. As an example, map generation system 102 and/or vehicle computing system 106 determines one or more exit locations of the global route at a predetermined distance (e.g., at a threshold distance from the starting location, at a threshold distance from a current location of autonomous vehicle 104, etc.). According to some non-limiting embodiments, map generation system 102 and/or vehicle computing system 106 may determine one or more exit locations in a cost field associated with a global route based on a sensor horizon (e.g., within a threshold distance of a sensor horizon).

In some non-limiting embodiments, map generation system 102 and/or vehicle computing system 106 determines one or more lanes (e.g., a subset of lanes) of a plurality of lanes in a cost field located at least a threshold distance (e.g., a horizon distance) from a starting location of autonomous vehicle 104 (e.g., a threshold distance from the starting location, a threshold distance from a sensor horizon, etc.) In some non-limiting embodiments, the one or more roadways located a threshold distance from the starting location may include exit locations that an autonomous vehicle 104 may traverse to exit from a local route in a cost field. In some non-limiting embodiments, the map generation system 102 determines one or more roadways from the plurality of lanes associated with a predetermined attribute (e.g., unfavorable attributes, forbidden lanes, etc.) before determining the one or more exit locations. For example, map generation system 102 removes one or more roadways from the plurality of lanes based on one or more attributes of a roadway (e.g., removes one or more forbidden lanes before determining the one or more exit locations, etc.).

In some non-limiting embodiments, map generation system 102 determines one or more exit locations by determining a shortest route in a cost field between a starting location and a plurality of lanes in the cost field. For example, map generation system 102 and/or vehicle computing system 106 applies a shortest path algorithm (e.g., Dijkstra's algorithm, etc.) to the plurality of lanes to determine a subset of roadways at a threshold distance from a starting location. For example, map generation system 102 and/or vehicle computing system 106 applies a shortest path algorithm (e.g., Dijkstra's algorithm, etc.) to the plurality of roadways (e.g., a plurality of lanes) to determine a subset of roadways in the plurality of roadways located at an exit horizon (e.g., an exit location, a horizon lane).

As further shown in FIG. 5, at step 504, process 500 includes determining a plurality of candidate local routes, in the one or more roadways, for each exit location of the one or more exit locations. For example, map generation system 102 and/or vehicle computing system 106 determines a plurality of candidate local routes, in the one or more roadways, for each exit location of the one or more exit locations.

In some non-limiting embodiments, map generation system 102 and/or vehicle computing system 106 determine one or more routes between the starting location and each of the exit locations. According to some non-limiting embodiments, map generation system 102 determines one or more candidate routes between the starting location and each of the exit locations with a cost for traversing one or more roadways between each of the exit locations and a destination location (e.g., goal location, organic goal, etc.). In some non-limiting embodiments, map generation system 102 applies an alphabetic sort algorithm to the one or more routes between the starting location and each of the exit locations. For example, map generation system 102 applies an alphabetic sort algorithm to each lane (e.g., a lane identifier and associated neighbor lanes identifier) that is assigned a letter of the alphabet.

As shown in FIG. 5, at step 506, process 500 includes determining at least one diversion point at which a first plurality of candidate local routes associated with a first exit location of the one or more exit locations separates from at least one or more local routes in a second plurality of candidate local routes associated with a second exit location of the one or more exit locations. For example, map generation system 102 and/or vehicle computing system 106 determines a diversion point, including one or more lanes in a plurality of the candidate local routes that may not be considered equivalent (e.g., lanes associated with different lane identifiers, etc.). For example, map generation system 102 determines non-equivalent lanes in the plurality of candidate routes where one or more lanes do not intersect (e.g., a match, etc.). For example, map generation system 102 determines a first lane is non-equivalent to a second lane (e.g., a change in lane identifier, etc.), if a first lane, including an identifier and/or an associated neighbor lane identifier, does not intersect with a second lane, including an identifier and/or an associated neighbor lane identifier. For example, a lane may be considered equivalent to another lane based on any intersection between a set, including the lane (e.g., a lane identifier) and neighbors (e.g., a neighbor lane identifier).

In some non-limiting embodiments, map generation system 102 and/or vehicle computing system 106 determine a first candidate local route and a second candidate local route in the first plurality of candidate local routes, based on the at least one diversion point, wherein the first candidate local route includes one or more lanes in the one or more roadways different from at least one lane in the one or more roadways in the second candidate local route. For example, a map generation system 102 determines one or more diversion points based on determining a change in lane identifier associated with a lower cost route on the forks. For example, a change in lane identifier along with a lower cost route extending from a diversion point (e.g., a fork in route, etc.) may refer to a diversion point in the local graph where the route diverges (e.g., forks, splits, etc.) from a single route into at least two routes, the at least two routes (e.g., each route) associated with one of the one or more of exit locations. As a further example, map generation system 102 may determine a threshold number of diversion points (e.g., a number of diversion points equal to a number of exit locations, etc.). Additionally, or alternatively, lower cost paths on the forks provides efficiency and accuracy by eliminating creation of any diversion point where a new path includes a higher cost than a current path. In some non-limiting embodiments, map generation system 102 stores the subset of lanes, which pass through a diversion point.

As shown in FIG. 5, at step 508, process 500 includes determining lanes in candidate local routes for each exit location. For example, map generation system 102 and/or vehicle computing system 106 determines one or more lanes (e.g., routable lanes traversed within a route element), as well as alternative lanes (e.g., routable lanes that may not be traversed within a route element) within the same segment of roadway based on the cost field associated with the global route for controlling an autonomous vehicle 104.

As shown in FIG. 5, at step 510, process 500 includes determining a lowest cost candidate local route of the plurality of candidate local routes for each exit location of the one or more exit locations, based on a cost associated with the one or more roadways. For example, map generation system 102 and/or vehicle computing system 106 determines a lowest cost route for the set of routes through a diversion point (e.g., each diversion point, a plurality of diversion points, etc.) between a starting location and a goal (e.g., destination location associated with the global route).

In some non-limiting embodiments, map generation system 102 and/or vehicle computing system 106 determines a cost for one or more lanes (e.g., each lane) in a lowest cost candidate local route. For example, map generation system 102 determines a cost for each lane in a lowest cost candidate route by initializing a route cost to goal as the route cost to the exit location. As an example, map generation system 102 generates a cost for each lane in a lowest cost candidate local route by populating the route cost into the lowest cost candidate local route recursively (e.g., a backward propagation, etc.) to construct a path cost for the local route (e.g., an aggregation of costs for each lane in the route, etc.). In some non-limiting embodiments, map generation system 102 determines appropriate lane costs using the cost field of the global route.

Referring now to FIGS. 6A-6D, FIGS. 6A-6D are diagrams of an overview of a non-limiting embodiment of an implementation 600 relating to a process for controlling an AV on a local route. As shown in FIGS. 6A-6D, implementation 600 may include autonomous vehicle 604, vehicle computing system 606, and vehicle controls 618. In some non-limiting embodiments, autonomous vehicle 604 may be the same or similar to autonomous vehicle 104. In some non-limiting embodiments, vehicle computing system 606 may be the same or similar to vehicle computing system 202. In some non-limiting embodiments, vehicle controls 618 may be the same or similar to vehicle controls 240. As shown by reference number 620 in FIG. 6A, autonomous vehicle 604 receives map data, including a global route between a starting location (e.g., the current location of an autonomous vehicle 604) and a destination location. In some non-limiting embodiments, the map includes receiving map data associated with a map of a geographic location, including a global route in one or more roadways between a current location of the AV and a destination location of the AV. For example, map generation system 102 and/or autonomous vehicle 104 (e.g., vehicle computing system 106) receives a global route between a starting location associated with an autonomous vehicle 104 (e.g., the current location of autonomous vehicle 104, a pickup location, etc.) and a destination location (e.g., a target location, a drop-off location, etc.). As an example, the destination for autonomous vehicle 104 is associated with an overall goal of the global route.

Figure 6A:
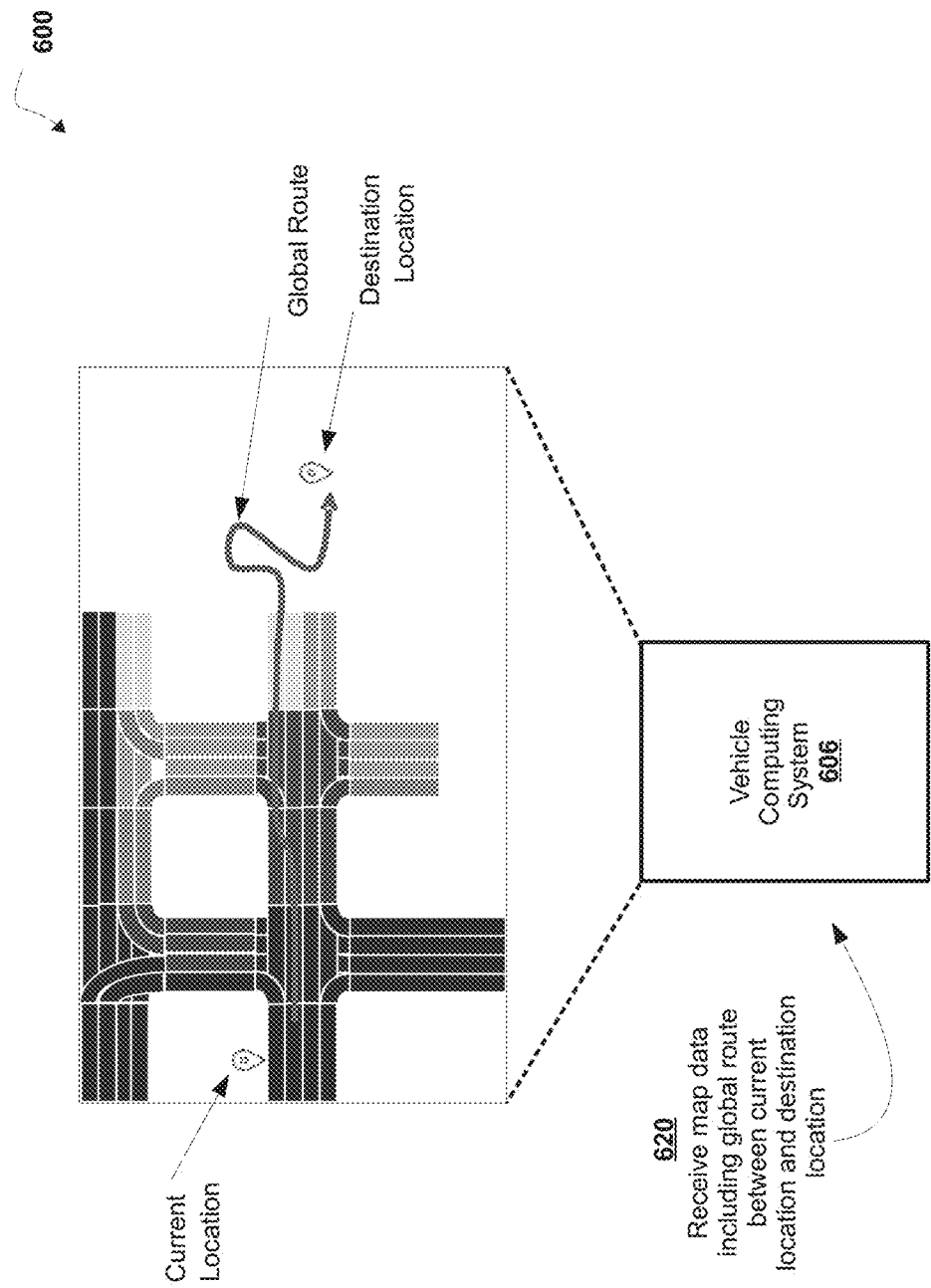
FIGS. 6A-6D are diagrams of an implementation of a non-limiting embodiment of a process disclosed herein.
Figure 6B:
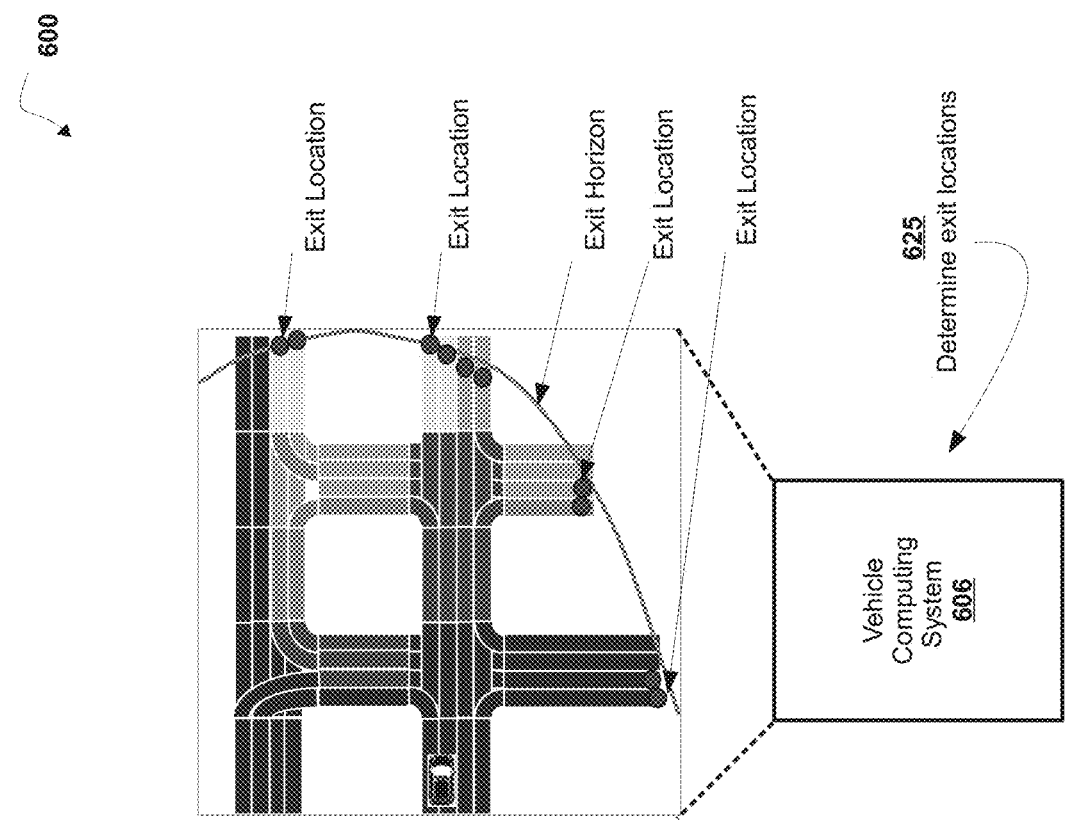

As shown by reference number 625 in FIG. 6B, vehicle computing system 606 determines a plurality of exit locations. As an example, vehicle computing system 606 determines exit locations that are located between the current location of the AV and the destination location of the AV. As an example, vehicle computing system 606 determines an exit location of the global route at a predetermined distance (e.g., a threshold distance from the starting location, a threshold distance from autonomous vehicle 604, etc.). For example, vehicle computing system 606 may determine an exit location in a global route, based on a sensor horizon (e.g., a sensor range). As an example, one or more exit locations in a global route are determined from an exit horizon at a distance from a sensor horizon.

Figure 6C:
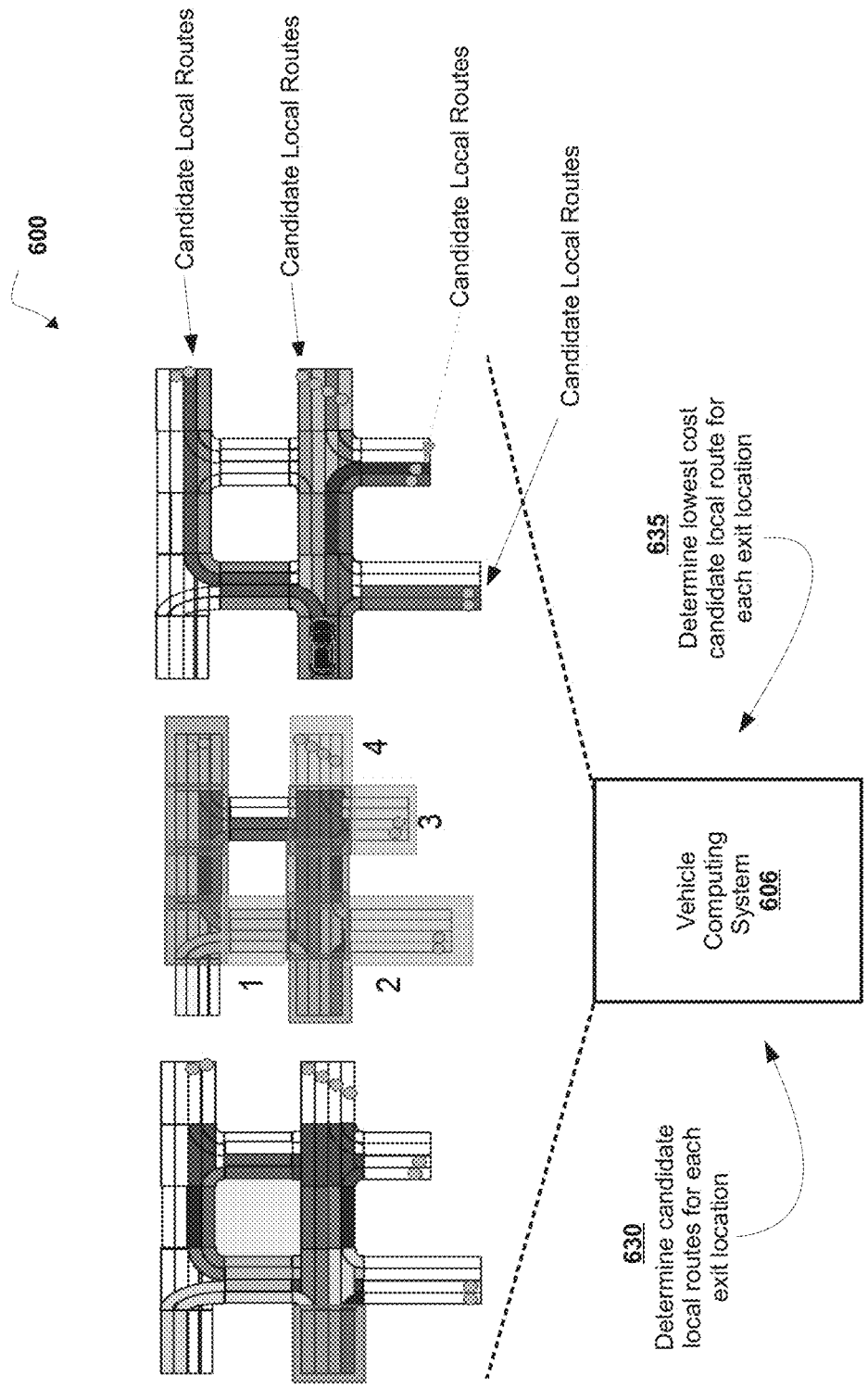

As shown by reference number 630 in FIG. 6C, vehicle computing system 606 determines, based on the map data, a plurality of candidate local routes in the one or more roadways between the current location of the AV and the exit locations. For example, vehicle computing system 606 determines one or more candidate routes between the starting location and each of the exit locations. In some non-limiting embodiments, candidate local routes are determined by sorting one or more lanes (e.g., each lane) of the plurality of candidate local routes.

In some non-limiting embodiments, vehicle computing system 606 determines one or more diversion points associated with a change in lane identifier in a lower cost route extending from a diversion point (e.g., a fork in the routes, etc.). As an example, a change in lane identifier and lower cost paths on the forks may refer to a diversion point in the local route where a route changes (e.g., splits, forks, etc.) from a single route into at least two different routes, the at least two different routes associated with one of the one or more exit locations.

In some non-limiting embodiments, vehicle computing system 606 determines one or more candidate lanes in a local route. As an example, the one or more candidate lanes include one or more routable lanes (e.g., a subset of lanes traversed within a route element), as well as alternative lanes within the same route element for controlling an autonomous vehicle 604 in a segment of a roadway in the geographic location.

For example, as shown by reference number 635 in FIG. 6C, vehicle computing system 606 determines a lowest cost candidate local route for each exit location. As an example, map generation system 102 determines a cost for one or more lanes (e.g., each lane, etc.) in a lowest cost candidate route by initializing a route cost to goal as the route cost to the exit location. For example, map generation system 102 generates a cost for each lane in a lowest cost candidate route by populating the route cost into the lowest cost candidate local route recursively (e.g., a backward propagation, etc.) to construct a path cost for the local route (e.g., an aggregation of costs for each lane in the route, etc.). In some non-limiting embodiments, map generation system 102 determines appropriate lane costs using the cost field of the global route.

Figure 6D:
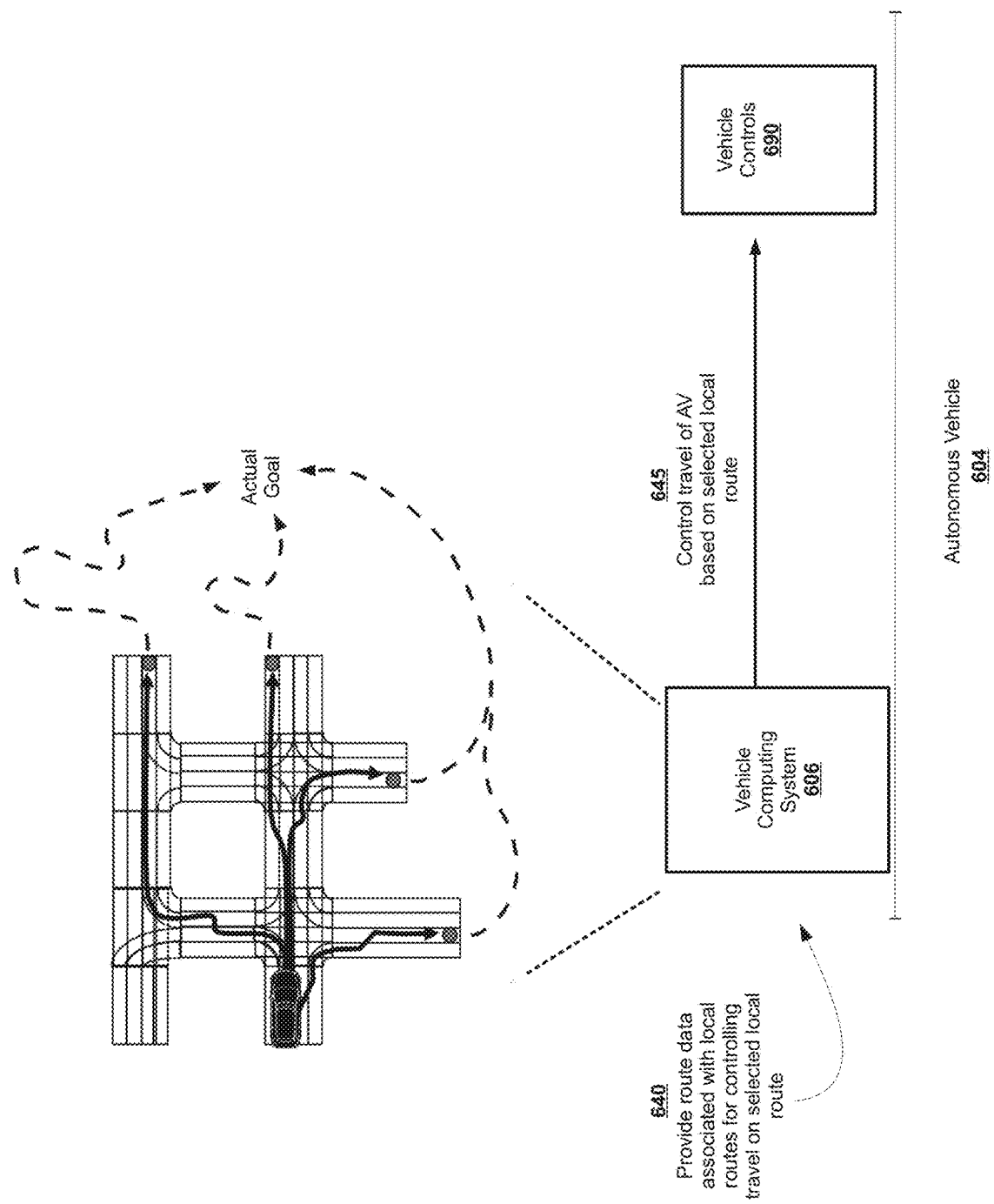

As shown by reference number 640 in FIG. 6D, vehicle computing system 606 provides route data associated with one or more local routes for controlling travel of autonomous vehicle 604 on a selected local route. For example, vehicle computing system 606 provides map data associated with a map of a geographic location, including one or more roadways in the geographic location that includes one or more local routes in the one or more roadways between a current location of the AV and one or more exit locations. In some non-limiting embodiments, map generation system 102 and/or vehicle computing system 106 provides map data associated with a map of a geographic location, including one or more local routes between a current location of autonomous vehicle 604 and one or more exit locations between the current location of autonomous vehicle 604 and a destination location in the global route.

Figure 7:
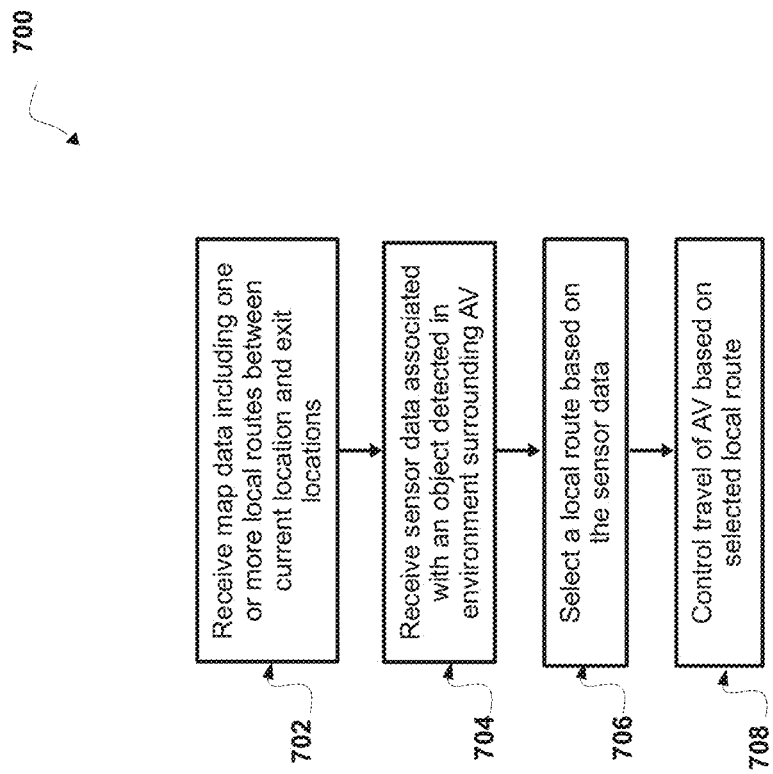
FIG. 7 is a flowchart of a non-limiting embodiment of a process for determining a route.

As shown by reference number 645 in FIG. 6D, vehicle controls 690 controls travel of the AV based on a selected local route. For example, vehicle controls 690 control autonomous vehicle 604 to operate on the local global route between a starting location and a destination location (e.g., an actual goal, etc.) based on a selected local route to an exit location in the plurality of local routes determined from a cost field associated with the global route Referring now to FIG. 7, FIG. 7 is a flowchart of a non-limiting embodiment of a process 700 for controlling an autonomous vehicle 104 on a local route. In some non-limiting embodiments, one or more of the steps of process 700 are performed (e.g., completely, partially, etc.) by autonomous vehicle 104 (e.g., one or more devices of autonomous vehicle 104, one or more devices of vehicle computing system 106, etc.). In some non-limiting embodiments, one or more of the steps of process 700 are performed (e.g., completely, partially, etc.) by another device or a group of devices separate from or including autonomous vehicle 104, such as map generation system 102 (e.g., one or more devices of map generation system 102).

As shown in FIG. 7, at step 702, process 700 includes receiving map data associated with a map of a geographic location, including one or more roadways in the geographic location that includes one or more local routes in the one or more roadways between a current location of the AV and one or more exit locations. In some non-limiting embodiments, map generation system 102 and/or vehicle computing system 106 receives map data associated with a map of a geographic location, including one or more roadways in the geographic location which includes one or more local routes in the one or more roadways between a current location of the AV and one or more exit locations between the current location of the AV and a destination location of the AV in a global route in the one or more roadways.

For example, autonomous vehicle 104 (e.g., vehicle computing system 106) and/or map generation system 102 receives map data, including a plurality of local routes (e.g., a route option in the global cost field, a portion of a global route, an alternative to a global route, etc.) in one or more roadways between a starting location of autonomous vehicle 104 (e.g., a starting location) and a plurality of exit locations that are located between a starting location of the AV and a destination location of the AV.

In some non-limiting embodiments, map generation system 102 and/or vehicle computing system 106 receives one or more local routes in the map data, associated with one or more exit locations in a cost field associated with a global route (e.g., a portion of a global cost field, a subsection of a global cost field, etc.). For example, the map generation system 102 determines one or more local routes, including one or more lanes (e.g., a route lane, an alternative lane, a preferred lane, etc.) in a cost field associated with a global route.

In some non-limiting embodiments, map generation system 102 and/or vehicle computing system 106 receives one or more local routes in the map data, including one or more lanes in a segment of a roadway between a starting location and an exit location. According to some non-limiting embodiments, vehicle computing system 106 receives one or more route elements in the one or more local routes, including the one or more lanes that are associated with one or more segments of a roadway between a starting location and an exit location.

For example, vehicle computing system 106 receives one or more route elements in the local route associated with a cost field in the global route. For example, vehicle computing system 106 receives one or more route elements in the map data, including one or more lanes (e.g., a route lane, an alternative lane, a preferred lane, etc.) associated with a segment of the roadway.

In some non-limiting embodiments, map generation system 102 and/or vehicle computing system 106 receives map data including connectivity information associated with one or more lanes of a roadway for determining a lane transition (e.g., a linear transition, a lateral transition) between the one or more lanes. For example, vehicle computing system 106 receives a cost field including connectivity information for controlling an autonomous vehicle 104 (e.g., before, during, after, etc.) on a trajectory (e.g., a path) between the one or more lanes (e.g., a lateral transition from a first lane to a second lane, a linear transition from a first lane to a second lane, a lane merger from a first lane into a second lane, a lane taper, and/or the like).

In some non-limiting embodiments, map generation system 102 and/or vehicle computing system 106 receives one or more local routes in the map data associated with a cost field of the global route. As an example, the one or more local routes include lane connectivity information, a cost to traverse a lane, a cost to traverse a local route and/or the like, based on cost field information associated with the global route. For example, vehicle computing system 106 receives a local route, including one or more lanes of a roadway in a cost field of the global route that an autonomous vehicle 104 may operate on.

In some non-limiting embodiments, map generation system 102 and/or vehicle computing system 106 receives map data, including a cost of a local route of the plurality of local routes associated with a cost field of the global route. As an example, vehicle computing system 106, when selecting a local route, determines a cost associated with traversing the local route based on a cost in a cost field of the global route for traversing one or more roadways of the local route. As a further example, vehicle computing system 106 receives a plurality of costs associated with the local route (e.g., a cost for each lane of a roadway in the local route) for determining a cost of the local route. In some non-limiting embodiments, a cost may be used by the map generation system 102, vehicle computing system 106, or another suitable routing system to determine one or more local routes for controlling an autonomous vehicle 104 in one or more roadways of the global route. For example, vehicle computing system 106 receives map data including a cost for one or more lanes in the local route from the map generation system 102, vehicle computing system 106, or another suitable routing system based on a cost for the one or more lanes in an associated cost field of the global route.

In some non-limiting embodiments, map generation system 102 and/or vehicle computing system 106 receives map data, including connectivity information, (e.g., an identifier of one or more lanes, a cost for autonomous vehicle 104 to transition to and/or from the one or more lanes in the local route, an indication a transition is available, etc.). For example, vehicle computing system 106 receives map data, including a cost to transition between one or more lanes in a segment of a roadway. According to some non-limiting embodiments, vehicle computing system 106 receives a roadway identifier (e.g., a lane identifier, a road segment identifier, a route element identifier) in the map data for identifying a next roadway (e.g., a lane to traverse after the current lane) in a local route, and a cost for planning a transition to the next roadway.

In some non-limiting embodiments, map generation system 102 and/or vehicle computing system 106 receives map data including a lane transition. For example, vehicle computing system 106 receives map data for controlling an autonomous vehicle 104 (e.g., before, during, after, etc.) during a lane transition in a local route (e.g., a lateral transition from a first lane to a second lane, a linear transition from a first lane to a second lane, a lane merger from a first lane into a second lane, a taper of a lane, and/or the like).

In some non-limiting embodiments, map generation system 102 and/or vehicle computing system 106 receives a plurality of lanes in a selected local route of the plurality of local routes in the map data that are associated with a cost for traveling from the current location of autonomous vehicle 104 to an exit location (e.g., a sequence of route elements, a sequence of costs, etc.). According to some non-limiting embodiments, vehicle computing system 106 receives a sequence of costs in the map data that decrease in the one or more costs associated with the one or more lanes of the local route from a first cost associated with a starting location to a final cost associated with the exit location.

In some non-limiting embodiments, map generation system 102 and/or vehicle computing system 106 receives map data, including one or more exit locations. For example, vehicle computing system 106 receives map data, including one or more exit locations associated with one or more roadways located at a distance from the starting location of autonomous vehicle 104. For example, vehicle computing system 106 receives map data for determining a selected local route, including an exit location in a roadway of the global route at a predetermined distance from the starting location of autonomous vehicle 104 (e.g., a threshold distance from the starting location, a threshold distance from autonomous vehicle 104, a threshold distance from a sensor horizon, etc.). In a further example, vehicle computing system 106 receives an exit location in a global route, based on a sensor horizon (e.g., a sensor range). For example, vehicle computing system 106 receives an exit location in the map data based on an exit location located at a distance from a sensor horizon (e.g., within, outside, etc.).

In some non-limiting embodiments, map generation system 102 and/or vehicle computing system 106 receives map data including sensor data from one or more sensors. For example, map data may include LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, map data associated with a map may include LIDAR point cloud data that represents objects and distances between objects in the geographic location of a map. Additionally, or alternatively, map data associated with a map may include LIDAR point cloud data that represents objects in the roadway, such as lane markers, road edges, and/or the like. According to some non-limiting embodiments, the map data includes lane information for lanes on which autonomous vehicle 104 can travel in one or more roadways (e.g., feature data, prediction data, perception data, route data, etc.), paths between lanes, and/or the like that cover the entire global route (e.g., each route of a plurality of routes in the global route from the starting location to the destination location, etc.).

As shown in FIG. 7, at step 704, process 700 includes receiving sensor data associated with an object detected in an environment surrounding the AV. In some non-limiting embodiments, autonomous vehicle 104 receives sensor data from one or more sensors. For example, sensor data includes (Light Detection and Ranging) LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, sensor data received by autonomous vehicle 104 includes LIDAR point cloud data that represents objects and distances between objects in the geographic location of autonomous vehicle 104. Additionally, or alternatively, map data associated with a map includes LIDAR point cloud data, which represents objects in a roadway of the geographic location, such as lane markers, road edges, and/or the like. According to some non-limiting embodiments, the map data includes lane information for lanes on which autonomous vehicle 104 can travel in one or more roadways (e.g., feature data, prediction data, perception data, route data, etc.), paths between lanes, and/or the like, that cover the entire global route (e.g., each route of a plurality of routes in the global route from the starting location to the destination location, etc.).

In some non-limiting embodiments, autonomous vehicle 104 receives sensor data from one or more sensors. For example, one or more sensors of autonomous vehicle 104 receive sensor data for detecting an object in the environment surrounding autonomous vehicle 104. In some non-limiting embodiments, autonomous vehicle 104 (e.g., one or more sensors of autonomous vehicle 104) provides the sensor data based on detecting the object in the environment surrounding the AV. For example, vehicle computing system 106 determines the selected local route of the plurality of local routes, based on sensor data from one or more sensors of an autonomous vehicle 104, which correspond to objects that have reflected a ranging laser of one or more mapping vehicles in a geographic location.

Further details regarding step 704 of process 700 are provided below with regard to FIG. 8.

As shown in FIG. 7, at step 706, process 700 includes selecting a local route of the one or more local routes, based on the sensor data. For example, map generation system 102 and/or vehicle computing system 106 selects a local route of the one or more local routes, based on sensor data associated with an object detected in an environment surrounding the AV. According to some non-limiting embodiments, vehicle computing system 106 selects the local route of the one or more local routes, based on sensor data from one or more sensors. For example, vehicle computing system 106 selects the local route of the one or more local routes based on sensor data from one or more sensors of an autonomous vehicle 104, which correspond to objects that have reflected a ranging laser of one or more mapping vehicles in a geographic location.

In some non-limiting embodiments, map generation system 102 and/or vehicle computing system 106 selects a local route of the one or more local routes based on LIDAR point cloud data that represents objects and distances between objects in the geographic location. Additionally, or alternatively, vehicle computing system 106 selects the local route of the one or more local routes based on LIDAR point cloud data that represents objects in the roadway, such as lane markers, road edges, and/or the like. According to some non-limiting embodiments, the LIDAR point cloud data includes lane information for lanes on which autonomous vehicle 104 can travel in one or more roadways (e.g., feature data, prediction data, perception data, route data, etc.), trajectories between lanes, and/or the like that cover the entire global route (e.g., each route of a plurality of routes in the global route from the starting location to the destination location, etc.).

In some non-limiting embodiments, vehicle computing system 106 selects a local route of the plurality of local routes, based on the plurality of costs associated with modifying the global route. For example, vehicle computing system 106 determines the selected local route of the plurality of local routes, based on sensor data associated with an object detected in an environment surrounding the AV. As an example, vehicle computing system 106 determines the selected local route of the plurality of local routes, based on LIDAR point cloud data that represents objects and distances between objects in the geographic location. Additionally, or alternatively, vehicle computing system 106 determines the selected local route of the plurality of local routes, based on LIDAR point cloud data that represents objects in the roadway, such as lane markers, road edges, and/or the like. According to some non-limiting embodiments, the LIDAR point cloud data includes lane information for lanes on which autonomous vehicle 104 can travel in one or more roadways (e.g., feature data, prediction data, perception data, route data, etc.), trajectories between lanes, and/or the like that cover the entire global route (e.g., each route of a plurality of routes in the global route from the starting location to the destination location, etc.).

In some non-limiting embodiments, vehicle computing system 106 determines a plurality of costs associated with modifying the global route between the current location of the AV and the destination location of the AV based on the plurality of local routes and the sensor data. For example, vehicle computing system 106 determines the selected local route from the plurality of local routes, based on the plurality of costs.

Further details regarding step 706 of process 700 are provided below with regard to FIG. 8.

As shown in FIG. 7, at step 708, process 700 includes controlling travel of the AV based on the selected local route. For example, autonomous vehicle 104 (e.g., vehicle computing system 106, etc.) controls autonomous vehicle 104, based on a selected local route of the one or more local routes. As a further example, vehicle computing system 106 controls autonomous vehicle 104 to operate on the global route between a starting location and a destination location, based on a selected local route to an exit location in the plurality of local routes determined from a cost field associated with the global route.

In some non-limiting embodiments, map generation system 102 (e.g., one or more devices of map generation system 102), autonomous vehicle 104 (e.g., vehicle computing system 106), or another device or a group of devices separate from or including map generation system 102, and/or autonomous vehicle 104 (e.g., vehicle computing system 106) controls autonomous vehicle 104 on a selected local route based on a displayed local route. For example, vehicle computing system 106 receives display information for determining a heat map (e.g., a graphical representation of data where the individual lanes or roadways are represented as colors, etc.) based on a cost field overlay, with a unique lane border color for one or more local routes associated with the global route. According to some non-limiting embodiments, vehicle computing system 106 may determine a border color (e.g., a heat map, etc.) based on the number of local routes.

In some non-limiting embodiments, map generation system 102 and/or vehicle computing system 106 controls autonomous vehicle 104 on a selected local route that is provided to a motion planning system of autonomous vehicle 104 for determining a motion plan of autonomous vehicle 104. For example, vehicle computing system 106 controls autonomous vehicle 104 on the selected local route of the plurality of local routes to accurately and efficiently control autonomous vehicle 104 on a relatively shorter motion plan of autonomous vehicle 104.

In some non-limiting embodiments, map generation system 102 and/or vehicle computing system 106 of autonomous vehicle 104 determines, based on sensor data, an obstruction in a roadway of a selected local route between the current location of the AV and the one or more exit locations. For example, vehicle computing system 106 determines an obstruction in a roadway of the selected local route between the current location of the AV and the one or more exit locations based on LIDAR point cloud data that represents objects and distances between objects in the geographic location.

In some non-limiting embodiments, map generation system 102 and/or vehicle computing system 106 receives one or more updated local routes in the one or more roadways between the current location of the AV and one or more updated exit locations located between the current location of the AV and the destination location of the AV in the global route in the one or more roadways. For example, vehicle computing system 106 receives an updated local route of the one or more updated local routes, based on sensor data from one or more sensors associated with detecting an object in the roadway surrounding autonomous vehicle 104.

In some non-limiting embodiments, map generation system 102 and/or vehicle computing system 106 controls autonomous vehicle 104 on an updated local route in the one or more updated local routes, based on sensor data associated with an object detected in an environment surrounding the AV. According to some non-limiting embodiments, vehicle computing system 106 selects an updated local route in the one or more updated local routes that deviates (e.g., circumvents, avoids, transitions, etc.) from the selected local route between the current location of the AV and the obstruction.

Figure 8:
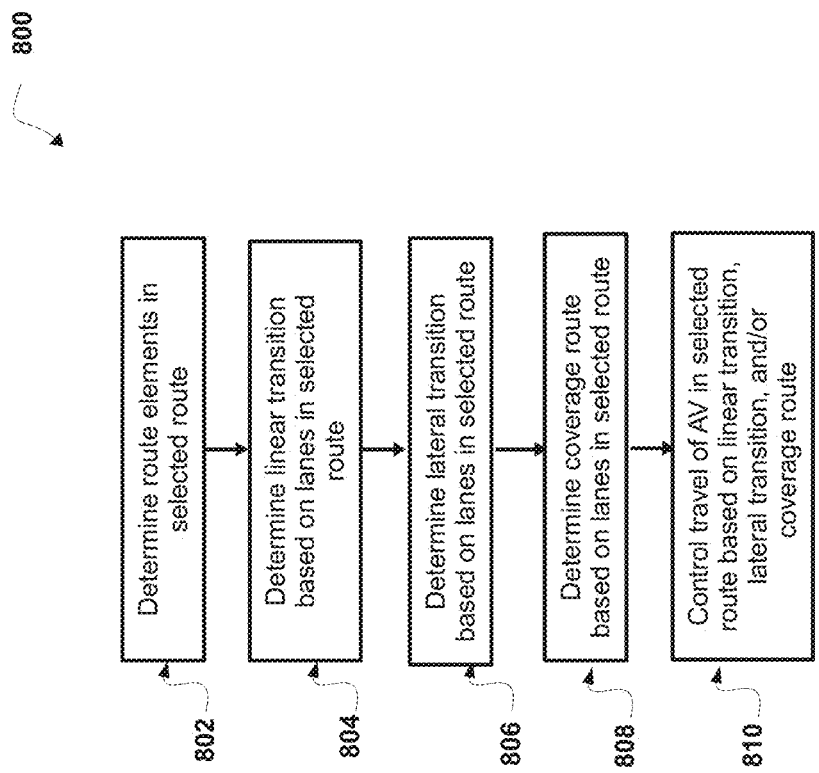
FIG. 8 is a flowchart of a non-limiting embodiment of a process for determining a route.

Referring now to FIG. 8, FIG. 8 is a flowchart of a non-limiting embodiment of a process 800 for controlling an AV on a local route. In some non-limiting embodiments, one or more of the steps of process 800 are performed (e.g., completely, partially, etc.) by autonomous vehicle 104 (e.g., one or more devices of autonomous vehicle 104, one or more device of vehicle computing system 106, etc.). In some non-limiting embodiments, one or more of the steps of process 800 are performed (e.g., completely, partially, etc.) by another device or a group of devices separate from or including autonomous vehicle 104, such as map generation system 102 (e.g., one or more devices of map generation system 102).

As shown in FIG. 8, at step 802, process 800 includes determining a plurality of route elements in the selected local route. For example, map generation system 102 and/or vehicle computing system 106 determines a plurality of route elements in the selected local route. For example, vehicle computing system 106 determines one or more route elements in the map data, including one or more lanes in a segment of a roadway between a starting location and an exit location. For example, vehicle computing system 106 determines one or more route elements in a local route associated with a cost field in the global route. For example, vehicle computing system 106 determines one or more route elements in the map data, including one or more lanes (e.g., a route lane, an alternative lane, a preferred lane, etc.) associated with a segment of the roadway.

In some non-limiting embodiments, map generation system 102 and/or vehicle computing system 106 determines a lane change based on connectivity information (e.g., cost of the current lane, indication a transition is available (e.g., a linear transition, a lateral transition, etc.), a cost for a transition (e.g., cost to linearly transition from this lane, cost to laterally transition from this lane, etc.)). For example, the vehicle computing system determines a lane change based on a route element. For example, the vehicle computing system 106 determines a lane change exists based on a number of lanes in the route element. Additionally, or alternatively, vehicle computing system 106 determines a lane change exists based on a position of two lanes (a first lane in a route element and a second lane in a route element, etc.) in a plurality of route elements (e.g., a position in a sequence of lanes, a position in a sequence of roadways, etc.) and a lane position (e.g., a position of lane in a roadway, an order in a roadway, etc.) of the lanes in a roadway (e.g., segment of a roadway, etc.).

In some non-limiting embodiments, map generation system 102 and/or vehicle computing system 106 determines an identifier for one or more lanes (e.g., each lane) in a route element. For example, vehicle computing system 106 determines a plurality of identifiers (e.g., a unique identifier) for a lane in a plurality of local routes (e.g., a unique instance of a lane used in a plurality of different local routes, etc.). For example, vehicle computing system 106 determines an identifier for one or more lanes (e.g., based on an identifier associated with a local route including the lane, based on a route elements location in a sequence of route elements of a local route, based on a lanes location within a route element).

In some non-limiting embodiments, map generation system 102 and/or vehicle computing system 106 determines one or more neighbor relations in a route element of the plurality of route elements. As an example, vehicle computing system 106 generates a sequence of route elements in the selected local route based on one or more neighbor relations associated with each route element of the plurality of route elements.

In some non-limiting embodiments, map generation system 102 and/or vehicle computing system 106 determines an identifier in a plurality of route elements in a selected local route for controlling autonomous vehicle 104. For example, an identifier for one or more lanes of a roadway in the route element may refer to an identifier (e.g., a token, a value, etc.), based on at least a portion of one or more of an identifier of a route element, a position of lanes in a sequence of lanes, a position of a roadway in a sequence of roadways, an identifier of a lane of a roadway, a position of a lane in a roadway, a left to right order in a roadway, and/or the like. According to some non-limiting embodiments, an identifier of a local route includes an identifier based on vehicle computing system 106 determining a sort order (e.g., sequence of routes) for one or more local routes (e.g., a local route in a sequence of a plurality of routes) between a starting location and an exit location.

In some non-limiting embodiments, map generation system 102 and/or vehicle computing system 106 determines connectivity information for a route element in the plurality of route elements of the selected route, including a linear transition and/or a lateral transition in the selected local route. For example, vehicle computing system 106 determines connectivity information in a route element in the selected local route for controlling an autonomous vehicle 104 (e.g., before, during, after, etc.) in a lane transition (e.g., a lateral transition from a first lane to a second lane, a linear transition from a first lane to a second lane, a lane merger from a first lane into a second lane, a taper of a lane, and/or the like).

In some non-limiting embodiments, map generation system 102 and/or vehicle computing system 106 determines a lane transition in a route element by determining connectivity information in one or more route elements of the selected local route associated with a lane transition in a roadway. For example, vehicle computing system 106 determines a lane transition by determining connectivity information in the selected local route associated with a first lane. As an example, vehicle computing system 106 determines connectivity information in the selected local route associated with a linear transition from a first lane to a second lane for an autonomous vehicle 104 in the selected local route. In a further example, vehicle computing system 106 determines connectivity information in the selected local route associated with a lateral transition from a first lane to a second lane for an autonomous vehicle 104. Still further, vehicle computing system 106 determines a local route that includes connectivity information associated with a coverage route for an autonomous vehicle 104. According to some non-limiting embodiments, vehicle computing system 106 may not determine a transition from a first lane to a second lane when an autonomous vehicle 104 is in a geographic location where a lane change is not permitted (e.g., a no change region in the geographic location). For example, an autonomous vehicle 104 may not transition from a first lane to a second lane unless a route element in the selected local route includes connectivity information for a transition from a first lane to a second lane.

As shown in FIG. 8, at step 804, process 800 includes determining a linear transition based on lanes in a selected route. For example, vehicle computing system 106 determines a linear transition between a first lane in a first route element in the selected local route and a second lane in a second route element in the selected local route, wherein the linear transition in the selected local route is associated with the first route element having only one lane.

In some non-limiting embodiments, map generation system 102 and/or vehicle computing system 106 determines connectivity information in one or more lanes of a route element (e.g., cost of the current lane, indication a transition is available (e.g., a linear transition, a lateral transition, etc.), a cost for a transition (e.g., cost to linearly transition from this lane, cost to laterally transition from this lane, etc.)). In some non-limiting embodiments, vehicle computing system 106 may generate a route element including a linear transition in a roadway, including a cost the same as the lane cost value.

In some non-limiting embodiments, map generation system 102 and/or vehicle computing system 106 determines a linear transition from the first lane to the second lane if a local route includes connectivity information between the first lane and the second lane. For example, vehicle computing system 106 determines a linear transition in a route element including only one lane identifier in the local route (e.g., in a preferred route). According to some non-limiting embodiments, vehicle computing system 106 determines a linear transition based on an identification of a first lane as preferred in a route element having two or more lanes. For example, an autonomous vehicle 104 may not transition from a first lane to a second lane if a local route does not include connectivity information for a lane transition to a second lane.

In some non-limiting embodiments, map generation system 102 and/or vehicle computing system 106 determines a linear transition in a route element, including connectivity information between a first lane and a second lane of a roadway. For example, vehicle computing system 106 receives connectivity information including one or more identifiers and a cost for a linear transition. For example, autonomous vehicle 104 receives map data including an identifier of a first lane and an identifier of a second lane for a lane transition from the first lane to the second lane. For example, vehicle computing system 106 determines in a local route including transitions: {linear, linear, lateral, linear, linear}, a local route includes a linear transition from lane one (e.g., route element one) to a neighbor lane in the different route element (e.g., route element two).

As shown in FIG. 8, at step 806, process 800 includes determining a lateral transition based on lanes in selected route. For example, vehicle computing system 106 determines a lateral transition between the first lane in the first route element in the selected local route and a second lane in the first route element in the selected local route, wherein the lateral transition in the selected local route is associated with the first route element having a plurality of lanes.

In some non-limiting embodiments, map generation system 102 and/or vehicle computing system 106 may determine a lateral transition based on a cost associated with transitioning between one or more lanes in a roadway of a local route. For example, vehicle computing system 106 may not determine a lane change for an autonomous vehicle 104 from a first lane to a second lane if a cost associated with the selected local route does not meet or exceed the cost for a local route having the second lane.

In some non-limiting embodiments, map generation system 102 and/or vehicle computing system 106 determines one or more lanes in a route element representing a position in a roadway (e.g., from left to right). For example, vehicle computing system 106 determines a plurality of lanes (e.g., an order, a lane orientation (e.g., left to right), etc.) in the same segment (e.g., a segment of a roadway, a segment of an intersection, etc.). According to some non-limiting embodiments, vehicle computing system 106 determines a leftmost lane as an identifier of lane one of four lanes in a roadway, and as an example, identifies (e.g., orders) the remaining lanes from left to right in a route element, such as {1, 2, 3, 4} associated with a segment of the roadway in the selected local route. For example, vehicle computing system 106 determines a lane change in a route element including a plurality of preferred lanes (e.g., in the previous example), based on at least two preferred lanes. In some non-limiting embodiments, a route element includes an indication of an order of transition of two preferred lanes on a local route (e.g., lanes on route={1, 2}, etc.) to denote that there are two lanes on an optimal path that are traversed in a left to right order in the selected local route. In a further example, vehicle computing system 106 determines a right to left transition for a lane change in the opposite direction (e.g., lanes on route={2, 1}).

In some non-limiting embodiments, map generation system 102 and/or vehicle computing system 106 determines a lane change based on determining two lanes in one route element on a local route (e.g., preferred lanes on an optimal route, etc.). For example, an identifier for one or more lanes in the route element, may refer to an identifier of a local route, an identifier of a route element (e.g., based on a position in a sequence of lanes, based on a position in a sequence of roadways, etc.), and an identifier of a lane of a roadway (e.g., based on a position of lane in a roadway, based on a left to right order in a roadway, etc.). According to some non-limiting embodiments, an identifier of a local route includes an identifier based on vehicle computing system 106 determining a sort order (e.g., sequence of routes) for one or more local routes (e.g., a local route in a sequence of a plurality of routes) between a starting location and an exit location. Further, vehicle computing system 106 determines an identifier in a local route for two lanes, in an example, as 2nd and 3rd from the left (e.g., preferred lanes) having identifiers: {1, 2, 1} and {1, 2, 2}.

For example, vehicle computing system 106 determines in a local route including transitions: {linear, linear, lateral, linear, linear}, a local route includes a transition from lane two to a neighbor in the same route element. According to some non-limiting embodiments, vehicle computing system 106 the local route includes a transition from lane two to the neighbor of its successor lane #3.

As shown in FIG. 8, at step 808, process 800 includes determining, based on the map data, at least one local coverage route in one or more roadways of the selected local route. For example, vehicle computing system 106 determines, based on map data, at least one local coverage route in one or more roadways of the selected local route.

In some non-limiting embodiments, map generation system 102 and/or vehicle computing system 106 determine the at least one local route, including a coverage route in one or more roadways of the selected local route between a starting location (e.g., a current location, a pick-up location, etc.) and an exit location (and including waypoints therebetween) by adjusting costs of local routes associated with the global route to the destination location and determining local routes or roadways that satisfy one or more threshold costs for the coverage route. As an example, an identification of an alternative subset of the one or more local routes or roadways in the cost field of the global route for coverage route is associated with factors or weights that modify costs of the one or more identified routes or roadways, where the costs of the routes or roadways are used for including or favoring the identified routes or roadways (or excluding or disfavoring the identified routes or roadways) for determination as the coverage route. For example, map generation system 102 and/or vehicle computing system 106 determine the coverage route based on the cost field of the global route that describe costs of including local routes or roadways in a plurality of local routes and, in some non-limiting embodiments, determine the coverage route to minimize a cost function or perform a function. In some non-limiting embodiments, map generation system 102 and/or vehicle computing system 106 generates the coverage route based on a machine learning technique.

In some non-limiting embodiments, a pass-through portion in the one or more roadways of the selected local route refers to at least one pass-through lane that autonomous vehicle 104 traverses in the selected local route. For example, the pass through portion of a coverage route includes one or more predetermined lanes which an autonomous vehicle 104 traverses in a selected local pass-through route.

In some non-limiting embodiments, the at least one local coverage route includes one or more repetitive portions in the one or more roadways of the selected local route, including one or more repeating lanes. For example, a traversal by autonomous vehicle 104 of the repetitive portion includes a plurality of traversals of the one or more repeating lanes. In some non-limiting embodiments, vehicle computing system 106 determines a progression (e.g., a sequence of lane traversals, etc.) associated with a repetitive portion in the one or more roadways of the selected local route.

In some non-limiting embodiments, map generation system 102 and/or vehicle computing system 106 determines a loop in a selected local route of a roadway. For example, one or more road segments in a pass-through route may provide lanes that are repeated in a local route between a starting location and the exit location.

In some non-limiting embodiments, vehicle computing system 106 monitors local route progress for a local route, including a loop or repetitive local route. For example, map generation system 102 and/or vehicle computing system 106 determines a number of traversals of one or more road segments in a pass-through route that are repeated in the local route between the starting location and the exit location. According to some non-limiting embodiments, a communication (e.g., a message, a signal, etc.) provides local route information, including information associated with a traversal of a pass through lane (e.g., a number of traversals, a selected local route identifier, a progression in a selected route, etc.)

As shown in FIG. 8, at step 808, process 800 includes controlling travel of an AV in selected route based on a linear transition, a lateral transition, and/or a coverage route. In some non-limiting embodiments, map generation system 102 and/or vehicle computing system 106 control autonomous vehicle 104 in a lane change based on connectivity information (e.g., cost of the current lane, indication a transition is available (e.g., a linear transition, a lateral transition, etc.), a cost for a transition (e.g., cost to linearly transition from this lane, cost to laterally transition from this lane, etc.)). For example, the vehicle computing system control autonomous vehicle 104 in a lane transition based on one or more route elements associated with a transition or a coverage route. For example, the vehicle computing system 106 determines a lane change exists based on a number of lanes in the route element. Additionally, or alternatively, vehicle computing system 106 control autonomous vehicle 104 in a lane change based on determining a transition from a position of two lanes (a first lane in a route element and a second lane in a route element, etc.) in a plurality of route elements (e.g., a position in a sequence of lanes, a position in a sequence of roadways, etc.) and/or a lane position (e.g., a position of lane in a roadway, an order in a roadway, etc.) of the lanes in a roadway (e.g., segment of a roadway, etc.).

Referring now to FIGS. 9A-9D, FIGS. 9A-9D are diagrams of an overview of a non-limiting embodiment of an implementation 900 relating to a process for controlling an AV on a local route. As shown in FIGS. 9A-9D, implementation 900 may include autonomous vehicle 904, vehicle computing system 906, and vehicle controls 990. In some non-limiting embodiments, autonomous vehicle 904 may be the same or similar to autonomous vehicle 104. In some non-limiting embodiments, vehicle computing system 906 may be the same or similar to vehicle computing system 106. In some non-limiting embodiments, vehicle controls 990 may be the same or similar to vehicle controls 240.

Figure 9A:
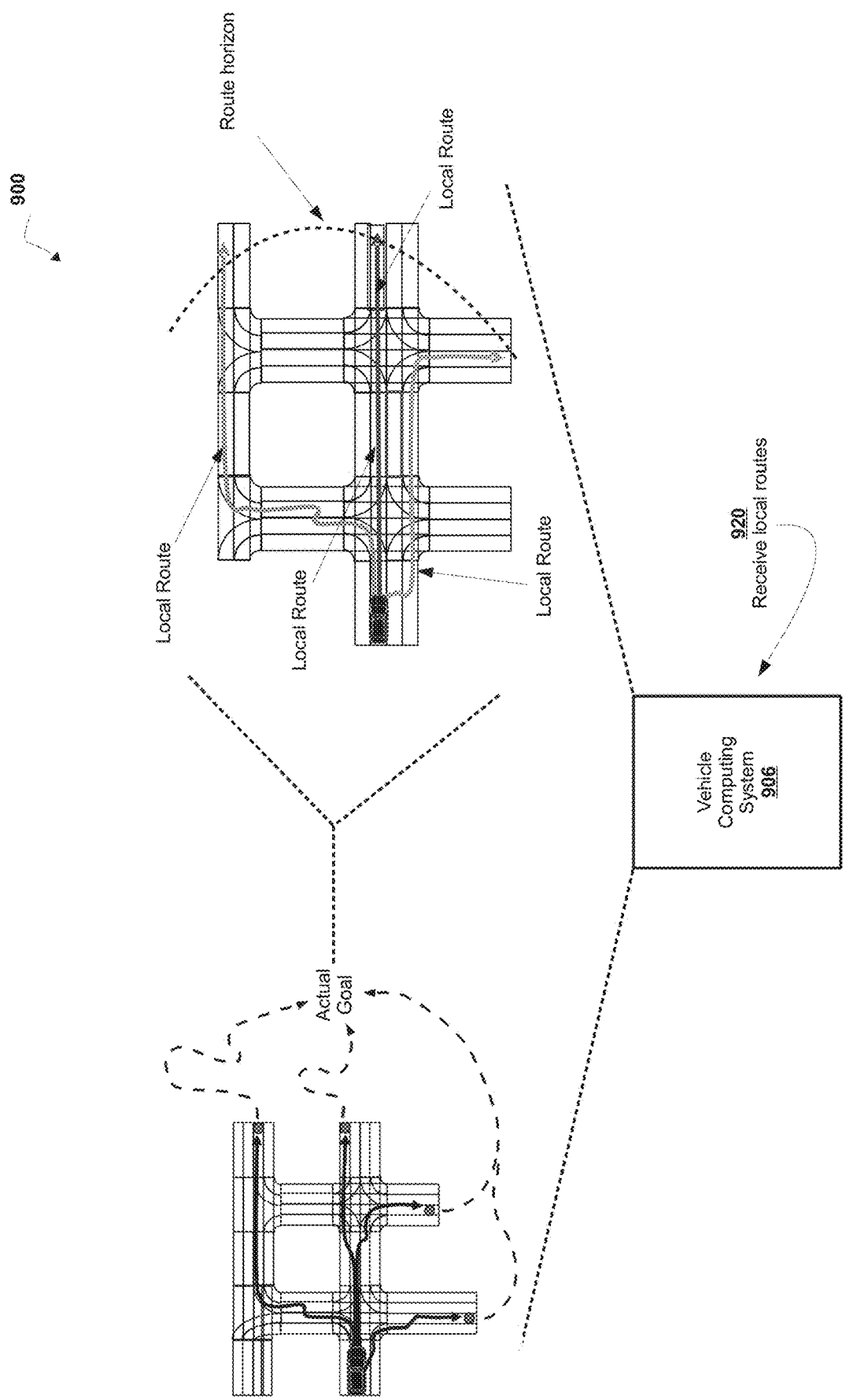
FIGS. 9A-9D are diagrams of an implementation of a non-limiting embodiment of a process disclosed herein.

As shown by reference number 920 in FIG. 9A, vehicle computing system 906 receives map data, including one or more local routes in the one or more roadways between a current location of autonomous vehicle 904 and one or more exit locations. In some non-limiting embodiments, map generation system 102 and/or vehicle computing system 106 receives map data associated with a map of a geographic location, including one or more local routes in the one or more roadways between a current location of the AV and one or more exit locations between the current location of the AV and a destination location of the AV in a global route in the one or more roadways.

Figure 9B:
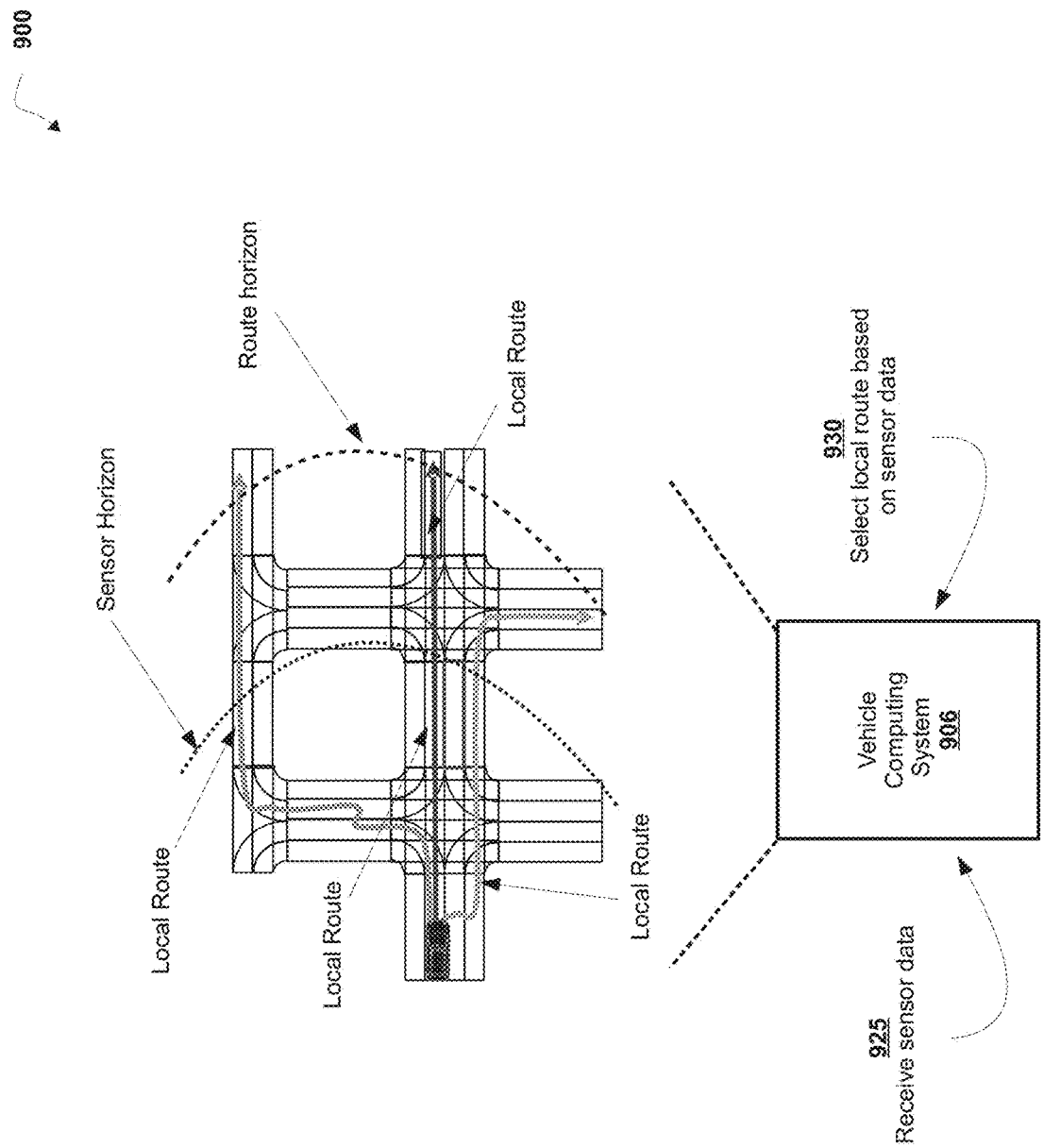

As shown by reference number 925 in FIG. 9B, vehicle computing system 906 receives sensor data. For example, vehicle computing system 906 receives sensor data associated with an object detected in an environment surrounding autonomous vehicle 904. For example, vehicle computing system 906 receives sensor data from one or more sensors 210 that are coupled to or otherwise included in autonomous vehicle 104. As shown by reference number 930 in FIG. 9B, vehicle computing system 906 selects a local route based on the sensor data. For example, vehicle computing system 906 selects, based on sensor data associated with detecting an obstacle in the roadway of a current local route, an updated local route preferred for avoiding an obstacle (e.g., a local route recommended based on sensor data, etc.).

Figure 9C:
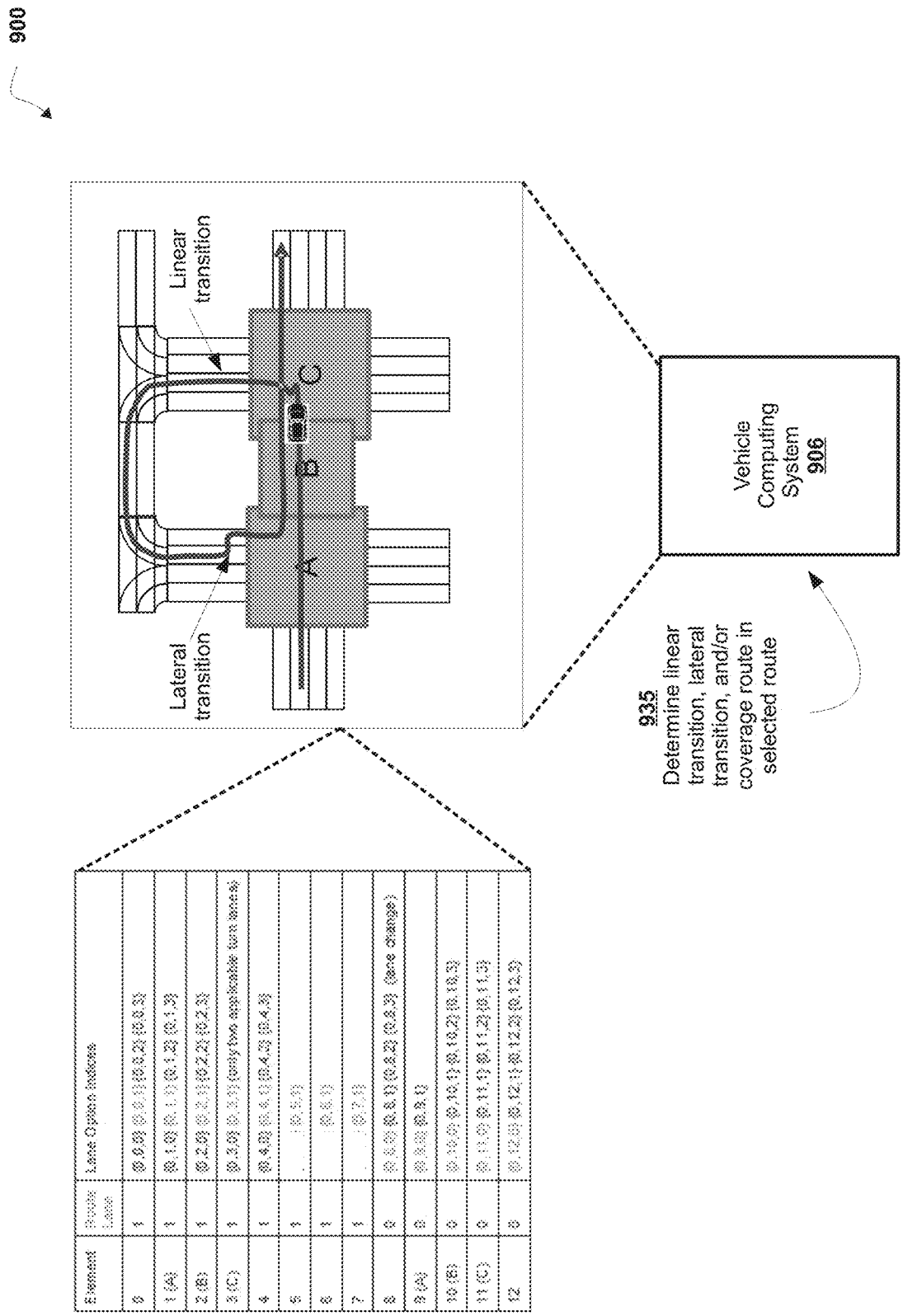

As shown by reference number 935 in FIG. 9C, vehicle computing system 906 determines a linear transition, a lateral transition, and/or a coverage route in the selected local route. For example, vehicle computing system 906 may determine a linear transition based on local routes associated with a roadway or a road segment in the roadway to avoid an obstacle. For example, vehicle computing system 906 determines at least one coverage route in one or more local routes between a current location of autonomous vehicle 904 and an exit location by adjusting costs of local routes associated with the global route to the destination location and determining local routes or roadways that satisfy one or more threshold costs for the coverage route used for including or favoring identified routes or roadways. For example, the coverage route includes controlling an autonomous vehicle 904 on a local route to minimize a cost function or perform a function. As shown, vehicle computing system 906 monitors progress of autonomous vehicle 904 on a local route including a loop. For example, vehicle computing system 906 monitors lane progression on a repetitive portion of a coverage route (e.g., from lane A, to lane B, to lane C, etc.) and controls autonomous vehicle 904 to finish the local route based on determining a loop is complete.

For example, vehicle computing system 906 determines a local route (e.g., including transitions: {linear (element 4), linear (element 5)} as shown) includes a linear transition from lane 4 to a neighbor, lane 5 based on connectivity information.

For example, vehicle computing system 906 determines a lateral transition in a local route (e.g., including transitions: {linear (element 8), lateral (element 8)} includes a transition, from lane two to a neighbor, lane one, in the same route element eight.

Figure 9D:
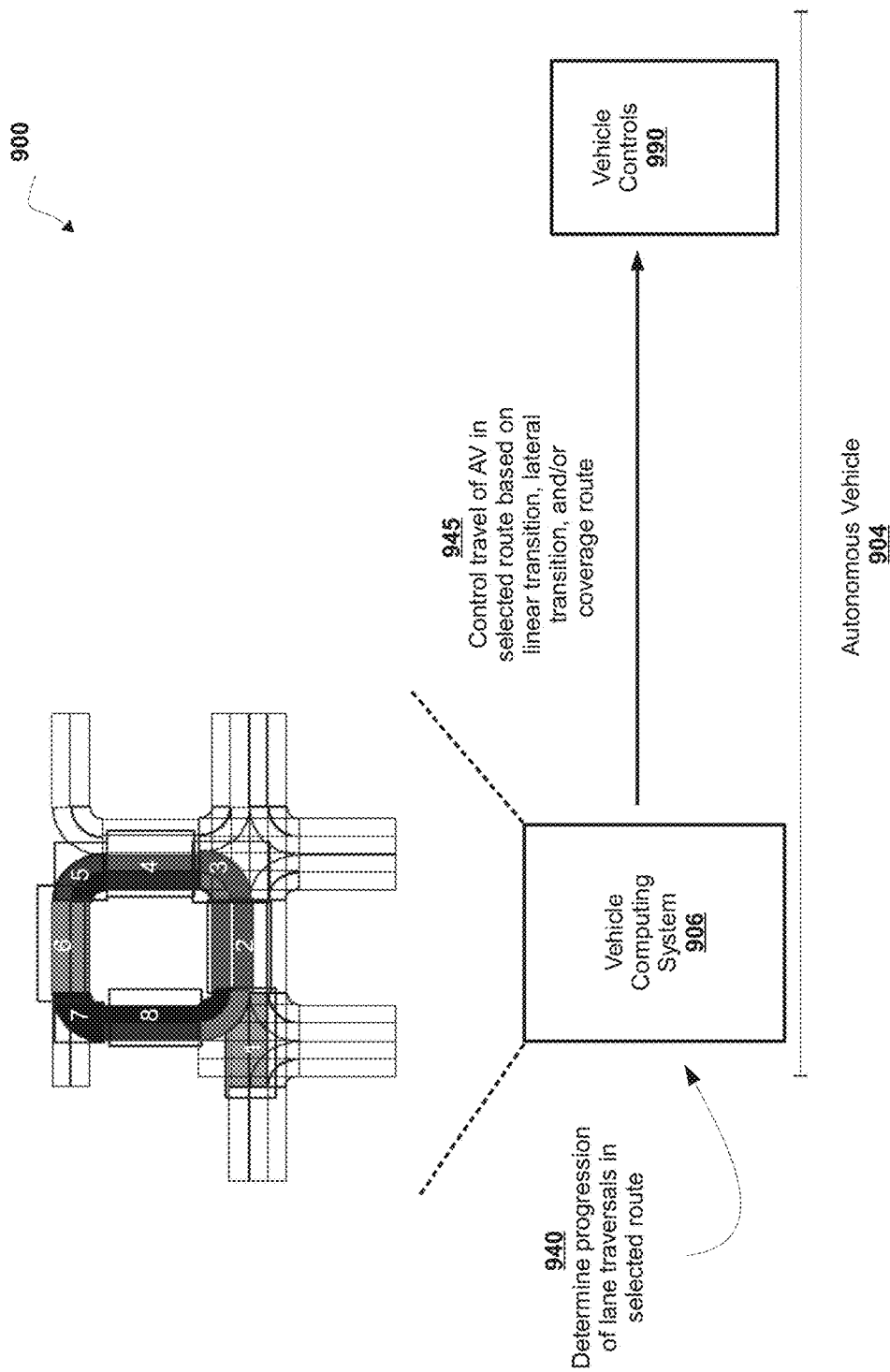

As shown by reference number 940 in FIG. 9D, vehicle computing system 906 determines a progression of lane traversals in the selected local route of autonomous vehicle 904 on selected local route. As shown by reference number 945 in FIG. 9D, vehicle controls 990 controls travel of the AV in the selected local route based on the linear transition, lateral transition, and/or a coverage route.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed:

1. An autonomous vehicle (AV) comprising:
a vehicle computing system comprising one or more processors, wherein the vehicle computing system is configured to:
receive map data associated with a map of a geographic location, wherein the map includes one or more roadways in the geographic location, and wherein the map data includes a global route in the one or more roadways between a current location of the AV and a destination location of the AV;
determine one or more local route end points based on a threshold distance and the current location of the AV, the one or more local route end points being located between the current location of the AV and the destination location of the AV;
determine, based on the map data, one or more local routes in the one or more roadways between the current location of the AV and the one or more local route end points, the one or more local routes comprising a plurality of candidate local routes for each local route end point of the one or more local route end points;
determine a lowest cost candidate local route of the plurality of candidate local routes for each local route end point of the one or more local route end points based on a cost associated with the one or more roadway;
determine a selected local route of the one or more local routes, the determining of the selected local route being based at least in part on the lowest cost candidate local route of the plurality of candidate local routes for each local route end point; and
control travel of the AV based on the selected local route of the one or more local routes.

2. The AV of claim 1, wherein the vehicle computing system determining the one or more local routes in the one or more roadways between the current location of the AV and the one or more local route end points is further configured to:
determine, based on the map data, a plurality of local routes in the one or more roadways between the current location of the AV and a plurality of local route end points, wherein the plurality of local route end points are located between the current location of the AV and the destination location of the AV.

3. The AV of claim 2, wherein the vehicle computing system is further configured to:
determine the selected local route of the plurality of local routes based on sensor data associated with an object detected in an environment surrounding the AV.

4. The AV of claim 2, wherein the vehicle computing system is further configured to:
determine a plurality of costs associated with modifying the global route between the current location of the AV and the destination location of the AV based on the plurality of local routes; and
determine the selected local route of the plurality of local routes based on the plurality of costs associated with modifying the global route.

5. The AV of claim 2, wherein the vehicle computing system is further configured to:
modify the global route based on the selected local route.

6. The AV of claim 1, wherein the vehicle computing system is further configured to:
determine the threshold distance of the one or more local route end points from the current location of the AV based on a sensor range of a sensor of the AV.

7. The AV of claim 1, wherein the vehicle computing system determining the lowest cost candidate local route of the plurality of candidate local routes for each local route end point of the one or more local route end points is further configured to:
determine at least one diversion point at which a first plurality of candidate local routes associated with a first exit location of the one or more local route end points diverges from a second plurality of candidate local routes associated with a second exit location of the one or more local route end points;
determine a first candidate local route and a second candidate local route in the first plurality of candidate local routes based on the at least one diversion point, wherein the first candidate local route includes one or more lanes in the one or more roadways different from at least one lane in the one or more roadways in the second candidate local route; and
determine the lowest cost candidate local route in the first plurality of candidate local routes associated with the first exit location based on a cost associated with the one or more lanes in the first candidate local route and the at least one lane in the second candidate local route.

8. A method for operating an autonomous vehicle (AV), the method comprising:
receiving, with a computer system comprising one or more processors, map data associated with a map of a geographic location, wherein the map includes one or more roadways in the geographic location, and wherein the map data includes a global route in the one or more roadways between a current location of an autonomous vehicle (AV) and a destination location of the AV;
determining with the computer system, one or more local route end points based on a threshold distance and the current location of the AV, the one or more local route end points being located between the current location of the AV and the destination location of the AV;
determining, with the computer system, based on the map data, one or more local routes in the one or more roadways between the current location of the AV and the one or more local route end points, the one or more local routes comprising a plurality of candidate local routes for each local route end point of the one or more local route end points;
determining a lowest cost candidate local route of the plurality of candidate local routes for each local route end point of the one or more local route end points based on a cost associated with the one or more roadways;
determining a selected local route of the one or more local routes, the determining of the selected local route being: based at least in part on the lowest cost candidate local route of the plurality of candidate local routes for each local route end point; and
controlling travel of the AV on the selected local route of the one or more local routes.

9. The method of claim 8, wherein determining the one or more local routes in the one or more roadways between the current location of the AV and the one or more local route end points further comprises:
determining, with the computer system, based on the map data, a plurality of local routes in the one or more roadways between the current location of the AV and a plurality of local route end points, wherein the plurality of local route end points are located between the current location of the AV and the destination location of the AV.

10. The method of claim 9, further comprising:
determining, with the computer system, the selected local route of the plurality of local routes based on sensor data associated with an object detected in an environment surrounding the AV.

11. The method of claim 9, further comprising:
determining, with the computer system, a plurality of costs associated with modifying the global route between the current location of the AV and the destination location of the AV based on the plurality of local routes; and
determining, with the computer system, the selected local route of the plurality of local routes based on the plurality of costs associated with modifying the global route.

12. The method of claim 9, further comprising:
modifying, with the computer system, the global route based on the selected local route.

13. The method of claim 8, further comprising:
determining, with the computer system, a threshold distance of the one or more local route end points from the current location of the AV based on a sensor range of a sensor of the AV.

14. The method of claim 13, wherein determining the lowest cost candidate local route of the plurality of candidate local routes for each local route end point of the one or more local route end points further comprises:
determining, with the computer system, at least one diversion point at which a first plurality of candidate local routes associated with a first exit location of the one or more local route end points diverges from a second plurality of candidate local routes associated with a second exit location of the one or more local route end points;
determining, with the computer system, a first candidate local route and a second candidate local route in the first plurality of candidate local routes based on the at least one diversion point, wherein the first candidate local route includes one or more lanes in the one or more roadways different from at least one lane in the one or more roadways in the second candidate local route; and
determining, with the computer system, the lowest cost candidate local route in the first plurality of candidate local routes associated with the first exit location based on a cost associated with the one or more lanes in the first candidate local route and the at least one lane in the second candidate local route.

15. A computer program product comprising at least one non-transitory computer-readable medium including one or more instructions that, when executed by at least one processor, cause the at least one processor to:
receive map data associated with a map of a geographic location, wherein the map includes one or more roadways in the geographic location, and wherein the map data includes a global route in the one or more roadways between a current location of an autonomous vehicle (AV) and a destination location of the AV;
determine one or more local route end points based on a threshold distance and the current location of the AV, the one or more local route end points being, located between the current location of the AV and the destination location of the AV;
determine, based on the map data, one or more local routes in the one or more roadways between the current location of the AV and the one or more local route end points, the one or more local routes comprising a plurality of candidate local routes for each local route end point of the one or more local route end points;
determine a lowest cost candidate local route of the plurality of candidate local routes for each local route end point of the one or more local route end points based on a cost associated with the one or more roadways;
determine a selected local route of the one or more local routes, the determining of the selected local route being based at least in part on the lowest cost candidate local route of the plurality of candidate local routes for each local route end point; and
control travel of the AV on the selected local route of the one or more local routes.

16. The computer program product of claim 15, wherein the one or more instructions, determining the one or more local routes in the one or more roadways between the current location of the AV and the one or more local route end points, further cause the at least one processor to:
determine, based on the map data, a plurality of local routes in the one or more roadways between the current location of the AV and a plurality of local route end points, wherein the plurality of local route end points are located between the current location of the AV and the destination location of the AV; and
determine the selected local route of the plurality of local routes based on sensor data associated with an object detected in an environment surrounding the AV.

17. The computer program product of claim 15, wherein the one or more instructions, determining the lowest cost candidate local route of the plurality of candidate local routes for each local route end point of the one or more local route end points, further cause the at least one processor to:
determine at least one diversion point at which a first plurality of candidate local routes associated with a first exit location of the one or more local route end points diverges from a second plurality of candidate local routes associated with a second exit location of the one or more local route end points;

determine a first candidate local route and a second candidate local route in the first plurality of candidate local routes based on the at least one diversion point, wherein the first candidate local route includes one or more lanes in the one or more roadways different from at least one lane in the one or more roadways in the second candidate local route; and determine the lowest cost candidate local route in the first plurality of candidate local routes associated with the first exit location based on a cost associated with the one or more lanes in the first candidate local route and the at least one lane in the second candidate local route.

* * * * *

UNITED STATES PATENT AND TRADEMARK OFFICE
CERTIFICATE OF CORRECTION

| | | |
|---|---|---|
| PATENT NO. | : 11,333,503 B2 | Page 1 of 1 |
| APPLICATION NO. | : 16/125205 | |
| DATED | : May 17, 2022 | |
| INVENTOR(S) | : Dean et al. | |

It is certified that error appears in the above-identified patent and that said Letters Patent is hereby corrected as shown below:

In the Claims

In Column 49, Line 51, in Claim 1, delete "roadway;" and insert --roadways;-- therefor In Column 50, Line 59, in Claim 8, after "determining", insert --,--

In Column 51, Line 11, in Claim 8, delete "being:" and insert --being-- therefor In Column 52, Line 22, in Claim 15, delete "being," and insert --being-- therefor Signed and Sealed this
Eighth Day of August, 2023

*Katherine Kelly Vidal*

Katherine Kelly Vidal
*Director of the United States Patent and Trademark Office*